US012738248B2

(12) United States Patent
Chen et al.

(10) Patent No.: US 12,738,248 B2
(45) Date of Patent: Sep. 15, 2026

(54) DRIVER SYSTEM OF ACTIVE MATRIX CHOLESTERIC LIQUID CRYSTAL DISPLAY AND STATIC IMAGE DISPLAYING METHOD THEREOF

(71) Applicant: GENETOUCH CORP., Taoyuan City (TW)

(72) Inventors: Cheng-Yu Chen, Taoyuan City (TW); Chi Lee, Taoyuan City (TW)

(73) Assignee: GENETOUCH CORP., Taoyuan City (TW)

(*) Notice: Subject to any disclaimer, the term of this patent is extended or adjusted under 35 U.S.C. 154(b) by 0 days.

(21) Appl. No.: 19/331,273

(22) Filed: Sep. 17, 2025

(65) Prior Publication Data

US 2026/0088003 A1 Mar. 26, 2026

(30) Foreign Application Priority Data

Sep. 23, 2024 (TW) ................................ 113135967

(51) Int. Cl.
*G09G 3/36* (2006.01)

(52) U.S. Cl.
CPC ......... *G09G 3/3677* (2013.01); *G09G 3/3688* (2013.01); *G09G 2310/08* (2013.01); *G09G 2320/0233* (2013.01); *G09G 2320/0257* (2013.01); *G09G 2330/021* (2013.01); *G09G 2340/0435* (2013.01)

(58) Field of Classification Search
CPC . G09G 3/3677; G09G 3/3688; G09G 2310/08
USPC .......................................................... 345/212
See application file for complete search history.

(56) References Cited

U.S. PATENT DOCUMENTS 10,909,941 B2 * 2/2021 An ....................... G09G 3/3685
2003/0151585 A1 * 8/2003 Ito ....................... G09G 3/3611 345/100
2003/0156089 A1 * 8/2003 Yamakawa .......... G09G 3/3622 345/96

(Continued)

FOREIGN PATENT DOCUMENTS

CN 113948046 A 1/2022
TW 201327520 A1 7/2013
TW 202343396 A 11/2023

*Primary Examiner* — Calvin C Ma
(74) *Attorney, Agent, or Firm* — Birch, Stewart, Kolasch & Birch, LLP

(57) ABSTRACT

A static image displaying method of an active matrix cholesteric liquid crystal display (AM ChLCD) is executed by a driver system for controlling the AM ChLCD. The method includes steps of: generating a voltage control command, a gate control command, and an image display command according to a static image parameter data, a data enable signal, and a vertical synchronization signal; generating a gate driver voltage and a plurality of data driver voltages according to the voltage control command; executing a set of static image display sequences for: outputting the gate driver voltage for switching on or switching off a plurality of display units of the AM ChLCD, controlling a chronological sequence of switching on or switching off the plurality of display units according to the gate control command, and outputting the plurality of data driver voltages to the plurality of display units that are switched on.

14 Claims, 8 Drawing Sheets

(56) References Cited

U.S. PATENT DOCUMENTS

| | | | | |
|---|---|---|---|---|
| 2005/0200587 | A1* | 9/2005 | Hwang | G09G 3/3688 345/96 |
| 2008/0001888 | A1* | 1/2008 | Lee | G09G 3/3688 345/96 |
| 2008/0158131 | A1* | 7/2008 | Park | G09G 3/3688 345/98 |
| 2010/0277406 | A1 | 11/2010 | Choi et al. | |
| 2011/0148845 | A1* | 6/2011 | Uehara | G09G 3/3692 345/212 |
| 2023/0408880 | A1* | 12/2023 | Ma | G02F 1/133753 |

* cited by examiner

DRIVER SYSTEM OF ACTIVE MATRIX CHOLESTERIC LIQUID CRYSTAL DISPLAY AND STATIC IMAGE DISPLAYING METHOD THEREOF

CROSS-REFERENCE TO RELATED APPLICATION(S)

This application claims the priority benefit of TW application serial No. 113135967 filed on Sep. 23, 2024, the entirety of which is hereby incorporated by reference herein and made a part of the specification.

BACKGROUND OF THE INVENTION

1. Field of the Invention

The present invention relates to a driver system of a cholesteric liquid crystal display and a displaying method thereof, more particularly a driver system of an active matrix cholesteric liquid crystal display and a static image displaying method thereof.

2. Description of the Related Art

A cholesteric liquid crystal display (ChLCD) is known to exhibit bistable liquid crystal displaying properties, meaning that the ChLCD is able to remain stable in two different states-a planar (texture) state and a focal conic (texture) state. In the planar state, the cholesteric liquid crystal is able to reflect incident light of particular wavelengths, and thus, the planar texture stable state may also be called a reflective state or a bright state. In the focal conic state, the cholesteric liquid crystal is able to scatter incident light, allowing the scattered incident light to pass through and be absorbed by a black film installed in the back of the ChLCD. For this reason, the focal conic state of the cholesteric liquid crystal may also be called a scattered state or a dark state.

When applying a driving voltage across the cholesteric liquid crystal, cholesteric liquid crystal molecules would be affected by an applied electric field, thus twisting and changing their arrangements, and allowing the cholesteric liquid crystal to change its state into either the planar state or the focal conic state. By applying various driving voltages across a plurality of cholesteric liquid crystals, the plurality of cholesteric liquid crystals may be arranged to be in the planar state or the focal conic state for a certain ratio, and thus a reflectance of the cholesteric liquid crystals may be tuned, allowing the cholesteric liquid crystals to display different grey scales and colors. According to the bistable properties, when the cholesteric liquid crystal is no longer supplied with the driving voltage, the cholesteric liquid crystal would stably maintain its current state. In other words, only when the cholesteric liquid crystal is supplied with the driving voltage would the cholesteric liquid crystal change its molecule arrangements for altering an image that is being displayed. Since the ChLCD is able to maintain the image that is currently being displayed when the ChLCD is not supplied with the driving voltage, the ChLCD is more often used for displaying a static image than other types of displaying devices.

A conventional passive matrix cholesteric liquid crystal display (PM ChLCD) includes a display panel, a scan driver, a data driver, a plurality of scan lines, and a plurality of data lines. The display panel includes a plurality of display units. The scan driver is connected to the plurality of scan lines, and each of the scan lines is mounted along a horizontal direction and is connected with each of the display units along a same horizontal line. The data driver is connected to the plurality of data lines, and each of the data lines is mounted along a vertical direction and is connected with each of the display units along a same vertical line. As a result, each of the display units is connected to one of the scan lines along the horizontal direction and is connected to one of the data lines along the vertical direction.

When the PM ChLCD displays the static image, the scan driver drives each of the scan lines in a set order, and the data driver correspondingly inputs a data signal into each of the display units according to the set order of how each of the scan lines is chronologically driven. Since the PM ChLCD is required to drive each of the scan lines in the set order, and since the PM ChLCD uses passive electronic components with only indium tin oxide (ITO) electrical pathways, the PM ChLCD does not use thin-film transistors (TFTs) for driving and the PM ChLCD requires a lot of time for driving each of the display units to update an overall displaying screen. Furthermore, by using passive electronic components, the PM ChLCD tends to have a lower contrast for a displaying image, and the PM ChLCD also requires more time for the data driver to output the data signals respectively into each of the display units, or requires the data driver to output the data signals respectively into each of the display units with more iterations, in order to ensure the cholesteric liquid crystal would have enough time to properly enter the focal conic state. Therefore, to ensure the dark state is sufficiently dark to satisfy an expected degree of contrast, a large amount of time is required for updating a current display.

On the other hand, the PM ChLCD is controlled by a timing controller. The timing controller not only stores an image data, but also processes the image data for generating a timing signal and a data signal correspondingly. Apart from using the timing signal and the data signal to control the scan driver and the data driver, the timing controller also stores the timing signal and the data signal, thus allowing the timing controller to iteratively output the data signal to each of the display units through the data driver for brightening a brightness of the current display. As such, the timing controller requires implementing a large internal memory or connecting to a large external memory for storing a large amount of data. Either way, requiring a large memory amounts to high cost for implementing the timing controller, and renders the timing controller relatively bulky in physical size. As the timing controller is unable to be further minimized in physical size, a driver of the ChLCD is also unable to be further minimized in physical size.

Furthermore, when consecutively supplying voltage of a same polarity to the ChLCD, the cholesteric liquid crystal molecules tend to be permanently polarized, thus creating voltage bias among the cholesteric liquid crystal molecules. This phenomenon hinders the ability for the cholesteric liquid crystal molecules to twist to expected angles, and therefore, causes the ChLCD to display abnormally with image sticking and uneven brightness.

Overall, as the conventional PM ChLCD is driven to display static images with low and limited refresh rates, the static images cannot be efficiently displayed and swiftly updated by the conventional PM ChLCD, which negatively affects a viewing experience of a user towards the conventional PM ChLCD. As the conventional PM ChLCD also requires high implementation cost for implementing the timing controller with a large memory, and as the conventional PM ChLCD tends to have its cholesteric liquid crystal molecules permanently polarized, the conventional PM ChLCD leaves much improvement to be desired.

SUMMARY OF THE INVENTION

To overcome the aforementioned shortcomings, the present invention provides a driver system of an active matrix cholesteric liquid crystal display (AM ChLCD) and a static image displaying method thereof. The present invention is able to increase a refresh rate of the AM ChLCD, and to prevent polarizations of cholesteric liquid crystal molecules by driving the AM ChLCD with opposite polarity driving voltages. As such, the present invention is also able to extend longevity of the AM ChLCD.

The present invention provides the driver system of the AM ChLCD that is utilized for controlling the AM ChLCD. The AM ChLCD includes a gate driver component, a data driver component, and a plurality of display units. The plurality of display units are electrically connected to the gate driver component and the data driver component. The driver system of the AM ChLCD includes:

- a timing controller, connected to the AM ChLCD; wherein according to a static image parameter data, a data enable signal, and a vertical synchronization signal, the timing controller generates a voltage control command, a gate control command, and an image display command, outputs the gate control command to the gate driver component, outputs the image display command to the data driver component, and controls the AM ChLCD to execute a set of static image display sequences;
- a power supply module, connected to the timing controller and the AM ChLCD; wherein according to the voltage control command, the power supply module generates a gate driver voltage and a plurality of data driver voltages, outputs the gate driver voltage to the gate driver component, and outputs the plurality of data driver voltages to the data driver component;
- wherein in the set of static image display sequences: the timing controller controls a chronological sequence of commanding the gate driver component to switch on or switch off the plurality of display units according to the gate control command; the gate driver component controls the plurality of display units to switch on or switch off according to the gate driver voltage; according to the image display command, the timing controller controls the data driver component to output the plurality of data driver voltages to the plurality of display units that are switched on;
- wherein the set of static image display sequences includes at least one positive polarity display period and at least one negative polarity display period; within the at least one positive polarity display period, the data driver component outputs the plurality of data driver voltages with positive polarity, and within the at least one negative polarity display period, the data driver component outputs the plurality of data driver voltages with negative polarity;
- wherein a total duration of each of the at least one positive polarity display period equals a total duration of each of at least one the negative polarity display period;
- wherein an averaged voltage magnitude of the plurality of data driver voltages within each of the at least one positive polarity display period equals an averaged voltage magnitude of the plurality of data driver voltages within each of the at least one negative polarity display period.

The present invention also provides a static image displaying method of the AM ChLCD that is utilized for controlling the AM ChLCD. The static image displaying method includes the following steps:

- generating a voltage control command, a gate control command, and an image display command according to a static image parameter data, a data enable signal, and a vertical synchronization signal;
- generating a gate driver voltage and a plurality of data driver voltages according to the voltage control command;
- executing a set of static image display sequences; wherein the set of static image display sequences includes steps of: outputting the gate driver voltage for switching on or switching off a plurality of display units of the AM ChLCD, controlling a chronological sequence of switching on or switching off the plurality of display units according to the gate control command, and outputting the plurality of data driver voltages to the plurality of display units that are switched on;
- wherein the set of static image display sequences includes at least one positive polarity display period and at least one negative polarity display period; within the at least one positive polarity display period, the plurality of data driver voltages with positive polarity are outputted to the plurality of display units, and within the at least one negative polarity display period, the plurality of data driver voltages with negative polarity are outputted to the plurality of display units;
- wherein a total duration of each of the at least one positive polarity display period equals a total duration of each of the at least one negative polarity display period;
- wherein an averaged voltage magnitude of the plurality of data driver voltages within each of the at least one positive polarity display period equals an averaged voltage magnitude of the plurality of data driver voltages within each of the at least one negative polarity display period.

In the present invention, the timing controller controls the AM ChLCD with the gate control command and the image display command, thus allowing the AM ChLCD to display a static image, and according to the voltage control command, the power supply module generates the gate driver voltage and the plurality of data driver voltages for supplying to the AM ChLCD. In comparison with a conventional passive matrix cholesteric liquid crystal display (PM ChLCD) and its displaying method, the AM ChLCD uses active electronic components, enabling the AM ChLCD to be driven with less time needed for refreshing a current display, thus having a higher refresh rate.

Moreover, under same driving voltage conditions, the AM ChLCD is able to display with a higher contrast. This means that the timing controller of the present invention is able to drive the AM ChLCD without needing to iteratively supply the same data driver voltages to drive the AM ChLCD, hence, without needing to store the static image in a large memory. Without needing to implement a large memory, the timing controller of the present invention is able to save implementation cost and decrease the timing controller's physical size. Furthermore, since the timing controller of the present invention is able to drive the AM ChLCD without needing to iteratively supply the same data driver voltages to drive the AM ChLCD for raising contrast, less time is needed for the AM ChLCD to update a frame of the current display. This more efficient way of updating the frame of the current display allows the present invention to have a higher refresh rate for displaying more stably contrasted static images, which greatly enhances a user's viewing/reading experience.

Furthermore, within the set of static image display sequences, by using same voltage magnitudes of opposite polarities to drive the AM ChLCD, in other words, by using the plurality of data driver voltages with positive polarity and using the plurality of data driver voltages with negative polarity to drive the AM ChLCD, the present invention is able to prevent polarizations of cholesteric liquid crystal molecules within the AM ChLCD, thus preventing image sticking and uneven brightness in the current display, and increasing a life expectancy of the AM ChLCD.

DETAILED DESCRIPTION OF THE INVENTION

Figure 1:
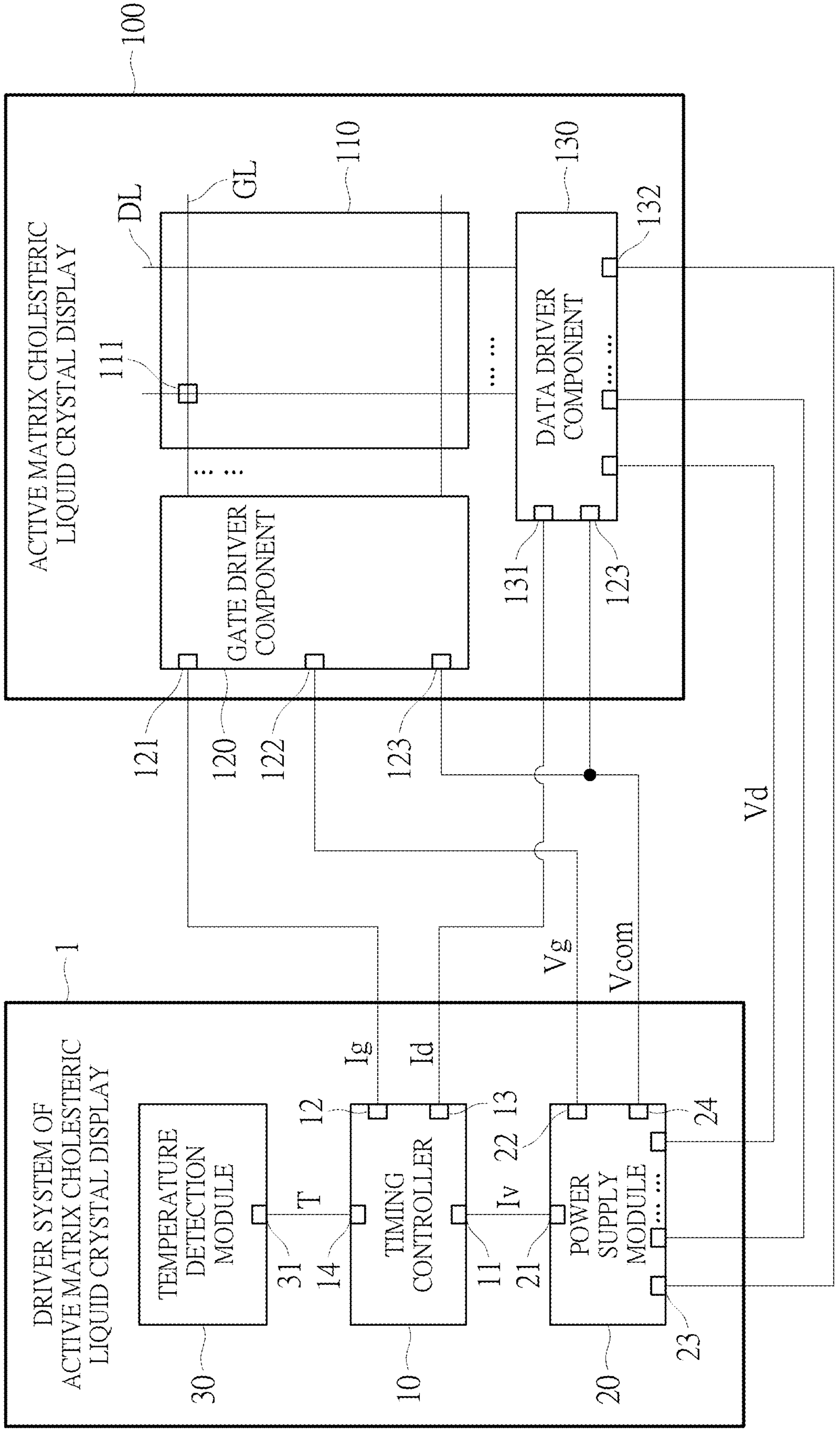
FIG. 1 is a block diagram of a driver system of an active matrix cholesteric liquid crystal display (AM ChLCD) of the present invention and the AM ChLCD.
Figure 2:
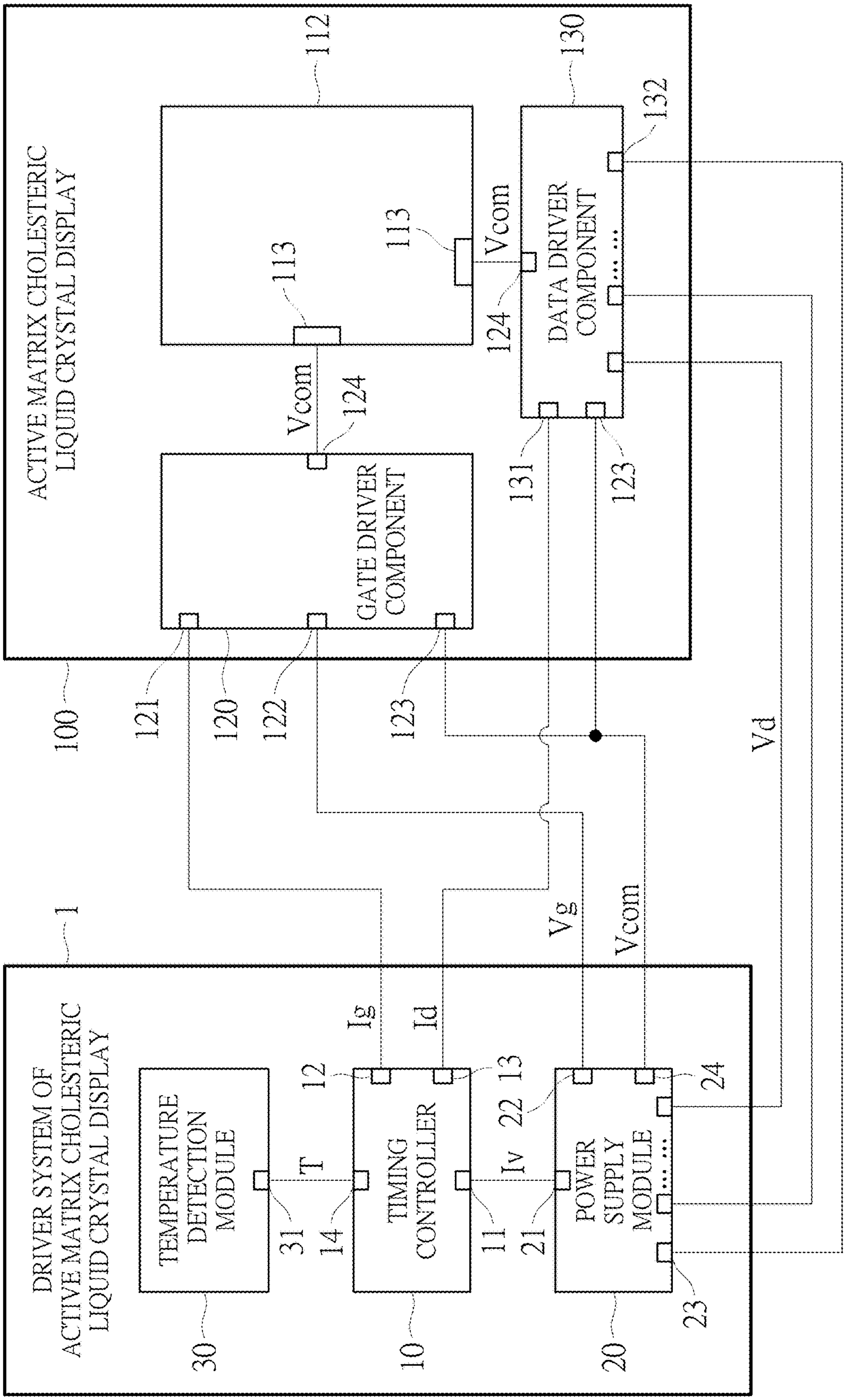
FIG. 2 is another block diagram of the driver system of the present invention and the AM ChLCD.

With references to FIG. 1 and FIG. 2, a driver system 1 of an active matrix cholesteric liquid crystal display (AM ChLCD) of the present invention is utilized for driving an active matrix cholesteric liquid crystal display (AM ChLCD) 100 for displaying static images. The driver system 1 includes a timing controller 10 and a power supply module 20. In an embodiment, the timing controller 10 is an integrated circuit (IC) chip, and the timing controller 10 may also be referred to as TCON. In other embodiments, the timing controller 10 may also be an electronic device with processing capabilities, such as a processor or a microcontroller unit (MCU). In the present embodiment, the power supply module 20 is a power supply.

With further references to FIGS. 3A to 3F, the timing controller 10 is connected to the AM ChLCD 100, and the timing controller 10 includes a power control port 11, a gate control port 12, and a data control port 13. The timing controller 10 generates a voltage control command (Iv), a gate control command (Ig), and an image display command (Id) according to a static image parameter data, a data enable signal (DE), and a vertical synchronization signal (Vertical sync, or Vsync). The timing controller 10 outputs the voltage control command (Iv) from the power control port 11 to the power supply module 20, outputs the gate control command (Ig) from the gate control port 12 to the AM ChLCD 100, and outputs the image display command (Id) from the data control port 13 to the AM ChLCD 100. By outputting the voltage control command (Iv), the gate control command (Ig), and the image display command (Id), the timing controller 10 controls the AM ChLCD 100 to execute a set of image reset sequences and a set of static image display sequences. The set of image reset sequences is executed for resetting a current display of the AM ChLCD 100, and the set of static image display sequences is executed for the AM ChLCD 100 to display a static image in the current display. More particularly, the static image parameter data includes a voltage parameter corresponding to each pixel in the static image. The voltage control command (Iv) includes various voltage values required for the AM ChLCD 100 to display the static image and to reset the current display. The gate control command (Ig) includes a chronological sequence for updating every pixel when the AM ChLCD 100 is displaying the static image. The image display command (Id) includes an image parameter data of the static image and a voltage value corresponding to each of the pixels when the AM ChLCD is displaying the static image.

The data enable signal (DE) defines a time duration of each frame. More particularly, the data enable signal (DE) defines a starting time and an ending time of a frame, and through modifying the time duration of each frame, a refresh rate of the AM ChLCD 100 is configured. The timing controller 10 utilizes the data enable signal (DE) as a reference for controlling the AM ChLCD 100 to chronologically display the static image and for correspondingly generating the gate control command (Ig), the image display command (Id), and the voltage control command (Iv) used for displaying the static image.

In an embodiment, the timing controller 10 converts the image display command (Id) to a mini low-voltage differential signaling (Mini-LVDS) format before outputting the image display command (Id) to the AM ChLCD 100.

In an embodiment, the timing controller 10 defaults a time duration or a frame number for executing the set of image reset sequences or the set of static image display sequences. When the timing controller 10 determines that the vertical synchronization signal (Vsync) equals a Vsync trigger voltage and the data enable signal (DE) equals an enable trigger voltage, the timing controller 10 first controls the AM ChLCD 100 to execute the set of image reset sequences, and when finishing executing the set of image reset sequences, upon the time when the data enable signal (DE) equals the enable trigger voltage, the timing controller 10 controls the AM ChLCD 100 to execute the set of static image display sequences.

In an embodiment, the timing controller 10 determines to execute the set of image reset sequences or the set of static image display sequences according to different voltage values of the data enable signal (DE). When the timing controller 10 determines that the vertical synchronization signal (Vsync) equals the Vsync trigger voltage and the data enable signal (DE) equals a first voltage, the timing controller 10 controls the AM ChLCD 100 to execute the set of image reset sequences. When the timing controller 10 determines that the data enable signal (DE) equals a second voltage, the timing controller 10 controls the AM ChLCD 100 to execute the set of static image display sequences.

The power supply 20 is connected to the timing controller 10 and the AM ChLCD 100. The power supply 20 includes a power communication port 21, a gate driver voltage port 22, a plurality of data driver voltage ports 23, and a common electrode voltage port 24. The power communication port 21 is connected to the power control port 11 of the timing controller 10, and the power supply 20 receives the voltage control command (Iv) outputted from the power control port 11 of the timing controller 10 through the power communication port 21. The gate driver voltage port 22, the plurality of data driver voltage ports 23, and the common electrode voltage port 24 all respectively connect the AM ChLCD 100. The power supply 20 respectively generates a gate driver voltage (Vg), a plurality of data driver voltages (Vd), and a common electrode voltage (Vcom) according to the voltage control command (Iv). The power supply 20 then outputs the gate driver voltage (Vg) from the gate driver voltage port 22, outputs the plurality of data driver voltages (Vd) from the plurality of data driver voltage ports 23, and outputs the common electrode voltage (Vcom) from the common electrode voltage port 24. Each of the data driver voltage ports 23 outputs one of the data driver voltages (Vd).

The power communication port 21 of the power supply 20 communicates with the power control port 11 of the timing controller 10 via an inter-integrated circuit ($I^2C$), thus allowing the timing controller 10 to configure and to control voltage values outputted from the gate driver voltage port 22, each of the data driver voltage ports 23, and the common electrode voltage port 24 of the power supply 20 according to the voltage control command (Iv).

In an embodiment, the power supply 20 configures voltage values and voltage polarities of the gate driver voltage (Vg), the plurality of data driver voltages (Vd), and the common electrode voltage (Vcom) according to each of the voltage parameters included in the voltage control command (Iv). As a result, the power supply 20 is able to generate the gate driver voltage (Vg), the plurality of data driver voltages (Vd), and the common electrode voltage (Vcom) with positive polarity, as well as to generate the gate driver voltage (Vg), the plurality of data driver voltages (Vd), and the common electrode voltage (Vcom) with negative polarity. The power supply 20 outputs the gate driver voltage (Vg) with either the positive polarity or the negative polarity from the gate driver voltage port 22 for switching on or switching off the gate of an active electronic component for a display unit. The power supply 20 outputs the plurality of data driver voltages (Vd) with either the positive polarity or the negative polarity from the data driver voltage ports 23, and the power supply 20 outputs the common electrode voltage (Vcom) with either the positive polarity or the negative polarity from the common electrode voltage port 24.

With references to FIG. 1 and FIG. 2, the AM ChLCD 100 includes a display panel 110, a gate driver component 120, and a data driver component 130. The display panel 110 includes a plurality of display units 111, a common electrode slab 112, and a cholesteric liquid crystal layer. Each of the display units 111 is electrically connected between the gate driver component 120 and the data driver component 130, and each of the display units 111 corresponds to a pixel of the current display displayed by the AM ChLCD 100. Moreover, each of the display units 111 includes at least one transistor. In an embodiment, the at least one transistor may be at least one N-type transistor, with a gate electrically connected to the gate driver component 120, a source electrically connected to the data driver component 130, and a drain electrically connected to the corresponding display unit 111. A plurality of common electrode voltage receiver ports 113 are mounted on the common electrode slab 112. The cholesteric liquid crystal layer is mounted between each of the display units 111 and the common electrode slab 112. Each of the cholesteric liquid crystal layer molecules within the cholesteric liquid crystal layer changes its respective states to particular twisted angles and molecule arrangements according to an electric field created by a voltage difference (Va) between each of the display units 111 and the common electrode slab 112. For each of the display units 111, by determining whether the received data driver voltage (Vd) subtracted by the common electrode voltage (Vcom) of the common electrode slab 112 results in a positive value or a negative value, a polarity of a period is determined.

For example, when the AM ChLCD 100 resets the current display, the voltage difference (Va) between each of the display units 111 and the common electrode slab 112 is determined to be either a positive polarity reset period (Rp) or a negative polarity reset period (Rn). After resetting the current display, when the AM ChLCD 100 starts displaying the current display, the voltage difference (Va) between each of the display units 111 and the common electrode slab 112 is determined to be either a positive polarity display period (Sp) or a negative polarity display period (Sn). The AM ChLCD 100 controls twisted angles and molecule arrangements of the cholesteric liquid crystal layer molecules for resetting or displaying contents in the current display.

The gate driver component 120 includes a gate communication port 121, a gate voltage input port 122, and a plurality of gate lines (GL). The gate communication port 121 and the gate voltage input port 122 are mounted at an input side of the gate driver component 120, and the plurality of gate lines (GL) are mounted at an output side of the gate driver component 120. The gate communication port 121 is connected to the gate control port 12 of the timing controller 10, thus allowing the gate communication port 121 to receive the gate control command (Ig) from the timing controller 10. The gate voltage input port 122 is electrically connected to the gate driver voltage port 22 of the power supply module 20, thus allowing the gate voltage input port 122 to receive the gate driver voltage (Vg) from the power supply module 20. Each of the plurality of gate lines (GL) is able to output the gate driver voltage (Vg), and each of the plurality of gate lines (GL) is respectively connected to the plurality of display units 111 on the same row or column. More particularly, each of the plurality of gate lines (GL) is respectively connected to a gate of the at least one transistor in the plurality of display units 111 on the same row or column. As such, the gate driver voltage (Vg) outputted by the power supply module 20 is able to be delivered to the gate of the at least one transistor in the plurality of display units on the same row or column, thus switching on or switching off the at least one transistor in the plurality of display units 111. Through switching on or switching off the at least one transistor, the corresponding display unit 111 may be controlled. According to the gate control command (Ig), the gate driver component 120 controls a chronological order of when each of the gate lines (GL) outputs the gate driver voltage (Vg). In different embodiments, according to the gate control command (Ig), the gate driver component 120 may control one or more than one of the gate lines (GL) to simultaneously output the gate driver voltage (Vg). In other words, the timing controller 10 may output the gate control command (Ig) for simultaneously driving the plurality of display units 111 connecting to one or more than one of the gate lines (GL).

In an embodiment, the gate driver component 120 includes a common electrode voltage input port 123 and a common electrode voltage output port 124. The common electrode voltage input port 123 is electrically connected to the common electrode voltage port 24 of the power supply module 20, thus allowing the common electrode voltage port 24 to receive the common electrode voltage (Vcom) from the power supply module 20. The common electrode voltage output port 124 is electrically connected to the plurality of common electrode voltage receiver ports 113 of the common electrode slab 112, thus allowing the common electrode voltage (Vcom) to be transported from the plurality of common electrode voltage receiver ports 113 to the common electrode slab 112 for changing an overall voltage potential of the common electrode slab 112 according to the common electrode voltage (Vcom). When the timing controller 10 controls the AM ChLCD 100 to reset the current display, the timing controller 10 outputs the gate control command (Ig), thus controlling the gate driver component 120 to output the common electrode voltage (Vcom) from the common electrode voltage output port 124 to the common electrode slab 112 when executing the set of image reset sequences. This creates the voltage difference (Va) between each of the display units 111 and the common electrode slab 112, and allows the said voltage difference (Va) to be used for resetting the current display of the AM ChLCD 100.

The data driver component 130 includes a data communication port 131, a plurality of data voltage input ports 132, and a plurality of data lines (DL). The data communication port 131 and the plurality of data voltage input ports 132 are mounted on an input side of the data driver component 130, and the plurality of data lines (DL) are mounted on an output side of the data driver component 130. The data communication port 131 is connected to the data control port 13 of the timing controller 10, thus allowing the data communication port 131 to receive the image display command (Id) from the timing controller 10. The plurality of data voltage input ports 132 are electrically connected to the plurality of data driver voltage ports 23 of the power supply module 20, thus allowing the plurality of data voltage input ports 132 to receive the plurality of data driver voltages (Vd) from the power supply module 20. The plurality of data lines (DL) output the plurality of data driver voltages (Vd), and each of the data lines (DL) is respectively connected to the plurality of display units 111 on the same row or column. More particularly, each of the plurality of data lines (DL) is respectively connected to a source of the at least one transistor in the plurality of display units 111 on the same row or column, thus allowing the plurality of data driver voltages (Vd), outputted from the power supply module 20, to correspondingly enter the plurality of display units 111 on the same row or column. The data driver component 130 controls each of the data lines (DL) to output one of the corresponding data driver voltages (Vd) according to the image display command (Id).

In an embodiment, the gate driver component 120 includes a common electrode voltage input port 123 and a common electrode voltage output port 124. The common electrode voltage input port 123 is electrically connected to the common electrode voltage port 24 of the power supply module 20, thus allowing the common electrode voltage port 24 to receive the common electrode voltage (Vcom) from the power supply module 20. The common electrode voltage output port 124 is electrically connected to the plurality of common electrode voltage receiver ports 113 of the common electrode slab 112, thus allowing the common electrode voltage (Vcom) to be transported from the plurality of common electrode voltage receiver ports 113 to the common electrode slab 112 for changing an overall voltage potential of the common electrode slab 112 according to the common electrode voltage (Vcom). When the timing controller 10 controls the AM ChLCD 100 to reset the current display, the timing controller 10 outputs the image display command (Id), thus controlling the data driver component 130 to output the common electrode voltage (Vcom) from the common electrode voltage output port 124 to the common electrode slab 112 when executing the set of image reset sequences. This creates the voltage difference (Va) between each of the display units 111 and the common electrode slab 112, and allows the said voltage difference (Va) to be used for resetting the current display of the AM ChLCD 100.

With reference to FIG. 1, the plurality of gate lines (GL) are parallel with each other and spaced apart from each other along a horizontal direction, and each of the gate lines (GL) is connected to each of the display units 111 on a same row. The plurality of data lines (DL) are parallel with each other and spaced apart from each other along a vertical direction, and each of the data lines (DL) is connected to each of the display units 111 on a same column. Each of the display units 111 is connected to one row of the gate lines (GL) and one column of the data lines (DL). When one of the gate lines (GL) outputs the gate driver voltage (Vg) to one of the display units 111, the said display unit 111 is switched on by the gate driver voltage (Vg), thus allowing one of the data lines (DL) to send in one of the data driver voltages (Vd) to the said display unit 111. As such, the voltage difference (Va) between the said display unit 111 and the common electrode slab 112 is modified by the said data driver voltage (Vd), allowing a grey scale value, a brightness value, and a colorization value corresponding to a pixel of the said display unit 111 to be controlled.

In an embodiment, the at least one transistor of each of the display units 111 is a thin-film transistor (TFT). The gate driver component 120 is a driver IC chip. In the embodiment with the at least one transistor as the at least one N-type transistor, the gate driver component 120 switches on or switches off the gate of the at least one transistor in the display units 111 of a same row or a same column, and thus the gate driver component 120 may also be called a scan driver component. The data driver component 130 may also be a driver IC chip. In the embodiment with the at least one transistor as the at least one N-type transistor, when the gate of the at least one transistor is switched on for each of the display units 111, the data driver component 130 inputs various voltages to the gates. As a result, the voltage difference (Va) between each of the display units 111 and the common electrode slab 112 is modified, allowing the grey scale value, the brightness value, and the colorization value corresponding to the pixel of each of the display units 111 to be controlled.

With reference to FIG. 2, two common electrode voltage receiver ports 113 are mounted on the common electrode slab 112. The gate driver component 120 and the data driver component 130 each respectively include a common electrode voltage input port 123 and a common electrode voltage output port 124. The gate driver component 120 and the data driver component 130 each receive the common electrode voltage (Vcom) from the respective common electrode voltage input port 123, and each outputs the common electrode voltage (Vcom) from the respective common electrode voltage output port 124 to the respective common electrode voltage receiver ports 113 of the common electrode slab 112. In other words, the common electrode voltage output port 124 of the gate driver component 120 is electrically connected to one of the common electrode voltage receiver ports 113 of the common electrode slab 112, and the common electrode voltage output port 124 of the data driver component 130 is electrically connected to another one of the common electrode voltage receiver ports 113 of the common electrode slab 112. When the timing controller 10 controls the AM ChLCD 100 to execute the set of image reset sequences, the timing controller 10 outputs the gate control command (Ig), thus controlling the gate driver component 120 to output the common electrode voltage (Vcom) from one of the common electrode voltage receiver ports 113 to the common electrode slab 112 when executing the set of image reset sequences. The timing controller 10 also outputs the image display command (Id), thus controlling the data driver component 130 to output the common electrode voltage (Vcom) from another one of the common electrode voltage receiver ports 113 to the common electrode slab 112 when executing the set of image reset sequences. As a result, the current display of the AM ChLCD 100 is reset.

When the timing controller 10 controls the AM ChLCD 100 to execute the set of static image display sequences, the timing controller 10 outputs the gate control command (Ig), thus controlling a chronological sequence of when the gate driver component 120 outputs the gate driver voltage (Vg) from the plurality of gate lines (GL) when executing the set of static image display sequences. The timing controller 10 also outputs the image display command (Id), thus controlling the data driver component 130 to output one of the data driver voltages (Vd) from the plurality of data lines (DL) when executing the set of static image display sequences. As a result, the current display of the AM ChLCD 100 is made to display the static image.

Overall, the timing controller 10 generates the voltage control command (Iv), the gate control command (Ig), and the image display command (Id) that correspond to the static image parameter data. The timing controller 10 outputs the voltage control command (Iv), the gate control command (Ig), and the image display command (Id) respectively to the power supply module 20, the gate driver component 120 and the data driver component 130. The timing controller 10 outputs the gate control command (Ig), thus confirming the chronological sequence of at least one transistor within each of the display units 111. With this chronological sequence included in the gate control command (Ig), the gate driver voltage (Vg) is transported to each of the corresponding display units 111 through each of the gate lines (GL), thus switching on or switching off at least one of the transistors in each of the display units 111 according to the gate control command (Ig). Moreover, when each of the display units 111 is switched on, the timing controller 10 configures various data driver voltages (Vd) outputted from the plurality of data lines (DL) to each of the display units 111 according to the image display command (Id). As a result, the pixel corresponding to each of the display units 111 is able to have the voltage difference (Va) between each of the display units 111 and the common electrode slab 112 according to the various data driver voltages (Vd), thus allowing the pixel of each of the display units 111 to display the static image with the corresponding grey scale value, the corresponding brightness value, and the corresponding colorization value.

Please note that the present embodiment only presents one of many possibilities of the AM ChLCD 100 for ease of explaining the driver system of the AM ChLCD 100 and the displaying method thereof. The AM ChLCD 100 is free to be elsewise in other embodiments. The cholesteric liquid crystal layer of the AM ChLCD 100 may be a single-colored cholesteric liquid crystal layer, a doubled-colored cholesteric liquid crystal layer, or a multi-colored cholesteric liquid crystal layer.

Figure 3A:
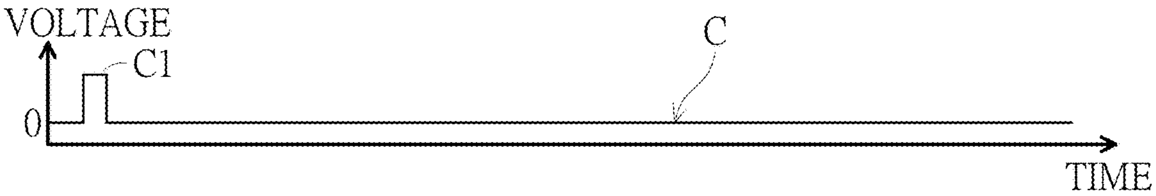
FIG. 3A is a signal perspective view of an image control signal of the driver system of the present invention.
Figure 3B:
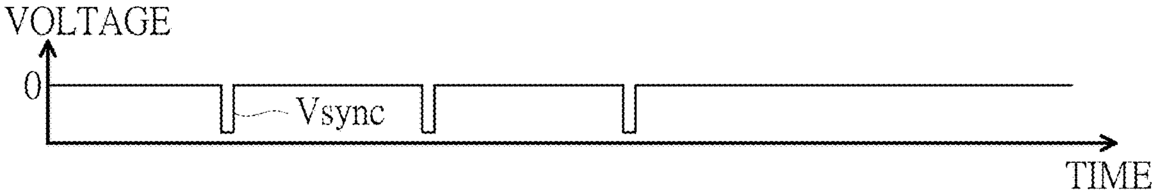
FIG. 3B is a signal perspective view of a vertical synchronization signal of the driver system of the present invention.
Figure 3C:
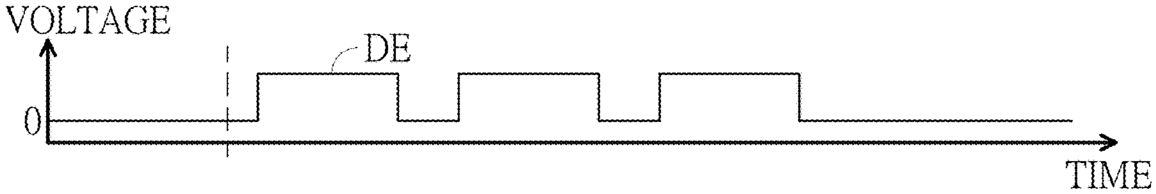
FIG. 3C is a signal perspective view of a data enable signal of the driver system of the present invention.
Figure 3D:
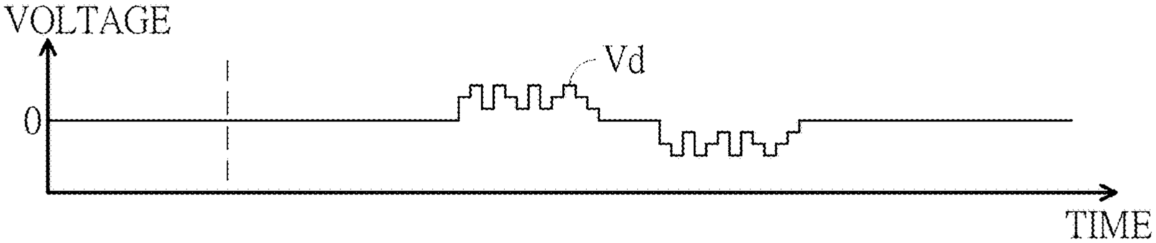
FIG. 3D is a waveform perspective view of a data driver voltage received by one of the display units of the driver system of the present invention.
Figure 3E:
FIG. 3E is a waveform perspective view of a common electrode voltage corresponding to one of the display units of the driver system of the present invention.
Figure 3F:
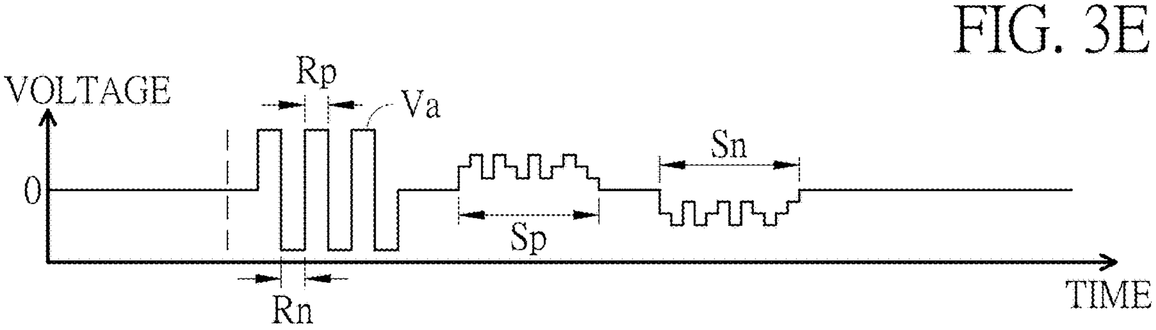
FIG. 3F is a waveform perspective view of a voltage difference across one of the display units of the driver system of the present invention.

With references to FIGS. 3A to 3F, a vertical axis of each of FIGS. 3A to 3F represents voltage in units of volt (V), and a horizontal axis of each of FIGS. 3A to 3F represents time in units of millisecond (ms). FIGS. 3D to 3F respectively correspond to the data driver voltages (Vd), the common electrode voltage (Vcom), and the voltage differences (Va) received by one of the display units 111, wherein the voltage differences (Va) are created by the data driver voltages (Vd) and the common electrode voltage (Vcom). A static image display command C1 is included in an image control signal C, and once the static image display command C1 is triggered, the timing controller 10 controls the AM ChLCD 100 to execute the set of image reset sequences and the set of static image display sequences.

The set of image reset sequences includes at least one positive polarity reset period (Rp) and at least one negative polarity reset period (Rn). Within the at least one positive polarity reset period (Rp), one of the display units 111 receives the common electrode voltage (Vcom) with negative polarity from the common electrode slab 112. Within the at least one negative polarity reset period (Rn), one of the display units 111 receives the common electrode voltage (Vcom) with positive polarity from the common electrode slab 112. A voltage magnitude of the common electrode voltage (Vcom) with negative polarity equals a voltage magnitude of the common electrode voltage (Vcom) with positive polarity. A total duration of the at least one positive polarity reset period (Rp) equals a total duration of the at least one negative polarity reset period (Rn). Since the common electrode voltage (Vcom) with negative polarity and the common electrode voltage (Vcom) with positive polarity are equal both in time durations and in voltage magnitudes, in the set of image reset sequences, a total voltage average of adding the common electrode voltage (Vcom) with positive polarity and adding the common electrode voltage (Vcom) with negative polarity equals zero.

With references to FIGS. 3A to 3F, in an embodiment, the set of image reset sequences includes a plurality of positive polarity reset periods (Rp) and a plurality of negative polarity reset periods (Rn). In the set of image reset sequences, the positive polarity reset periods (Rp) and the negative polarity reset periods (Rn) are sequentially arranged in an alternating order. This means that one of the positive polarity reset periods (Rp) is sequentially arranged to be between two of the negative polarity reset periods (Rn), and that one of the negative polarity reset periods (Rn) is sequentially arranged to be between two of the positive polarity reset periods (Rp).

With references to FIGS. 3D to 3F, in an embodiment, within the set of image reset sequences, the data driver component 130 does not output any of the data driver voltage (Vd) to any of the display units 111, which means that one of the display units 111 receives the data driver voltage (Vd) with zero volt. The display units 111 are mounted on a pixel electrode slab, and a voltage difference between the pixel electrode slab and the common electrode slab 112 equals the common electrode voltage (Vcom) received by the common electrode slab 112. Therefore, within the set of image reset sequences, a waveform of the voltage difference (Va) for one of the display units 111 is equal to a waveform of the common electrode voltage (Vcom) with opposite polarities. In other words, the data driver voltage (Vd) with zero volt minus the common electrode voltage (Vcom) equals the voltage difference (Va) with opposite polarities to the common electrode voltage (Vcom).

Within the set of static image display sequences, the set of static image display sequences includes at least one positive polarity display period (Sp) and at least one negative polarity display period (Sn). In the present embodiment, the set of static image display sequences only includes one positive polarity display period (Sp) and one negative polarity display period (Sn) for signal waveform demonstrations. Within the at least one positive polarity display period (Sp), one of the display units 111 receives the plurality of data driver voltages (Vd) with positive polarity from the data driver component 130. Within the at least one negative polarity display period (Sn), one of the display units 111 receives the plurality of data driver voltages (Vd) with negative polarity from the data driver component 130. An averaged voltage magnitude of the plurality of data driver voltages (Vd) within each positive polarity display period (Sp) equals an averaged voltage magnitude of the plurality of data driver voltages (Vd) within each negative polarity display period (Sn). A total duration of each positive polarity display period (Sp) equals a total duration of each negative polarity display period (Sn). Since the data driver voltages (Vd) with positive polarity and the data driver voltages (Vd) with negative polarity are equal both in time durations and in averaged voltage magnitudes, when a number of the at least one positive polarity display period (Sp) equals a number of the at least one negative polarity display period (Sn) in the set of static image display sequences, a total voltage average of adding the data driver voltages (Vd) with positive polarity and the data driver voltages (Vd) with negative polarity equals zero.

With references to FIGS. 3D to 3F, in an embodiment, within the set of image display sequences, the common electrode slab 112 does not receive any of the common electrode voltages (Vcom), and thus the common electrode slab 112 remains zero volt. As the display units 111 are mounted on the pixel electrode slab, and the voltage difference between each of the display units 111 on the pixel electrode slab and the common electrode slab 112 equals each of the data driver voltages (Vd). Therefore, within the set of static image display sequences, a waveform of the voltage difference (Va) for one of the display units 111 is equal to a waveform of one of the data driver voltages (Vd). In other words, one the data driver voltage (Vd) minus the common electrode voltage (Vcom) with zero volt equals the voltage difference (Va) that is correspondingly equal to one of the data driver voltages (Vd).

Figure 4A:
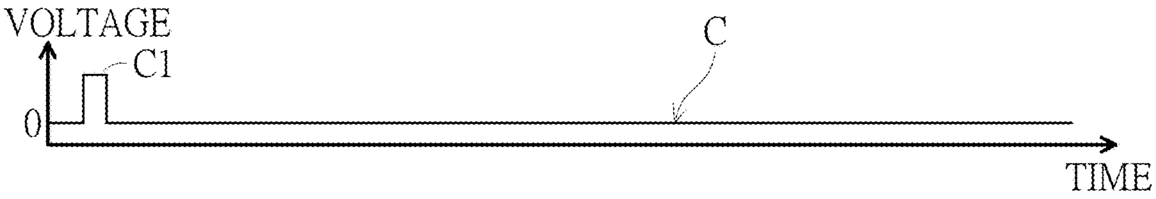
FIG. 4A is another signal perspective view of the image control signal of the driver system of the present invention.
Figure 4B:
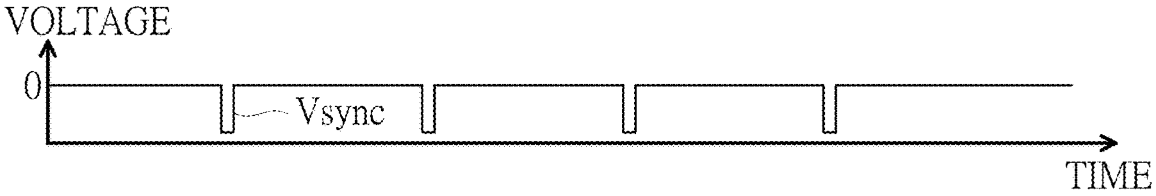
FIG. 4B is another signal perspective view of the vertical synchronization signal of the driver system of the present invention.
Figure 4C:
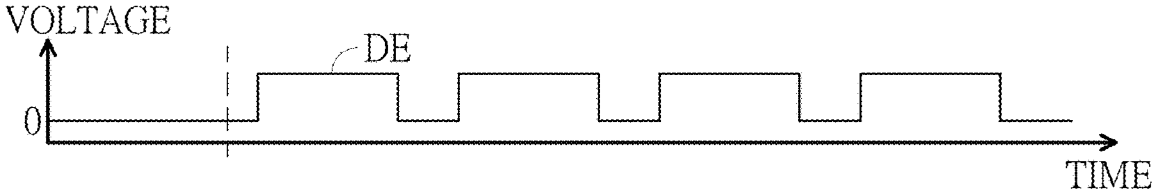
FIG. 4C is another signal perspective view of the data enable signal of the driver system of the present invention.
Figure 4D:
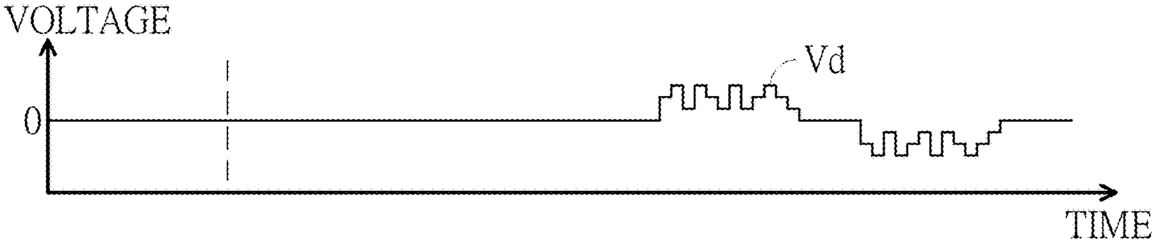
FIG. 4D is another waveform perspective view of the data driver voltage received by one of the display units of the driver system of the present invention.
Figure 4E:
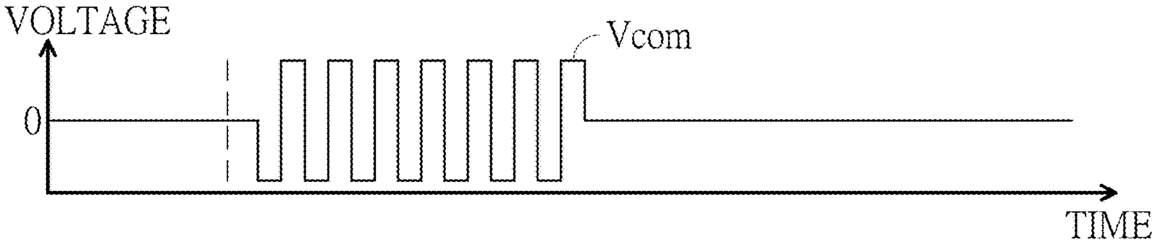
FIG. 4E is another waveform perspective view of the common electrode voltage corresponding to one of the display units of the driver system of the present invention.
Figure 4F:
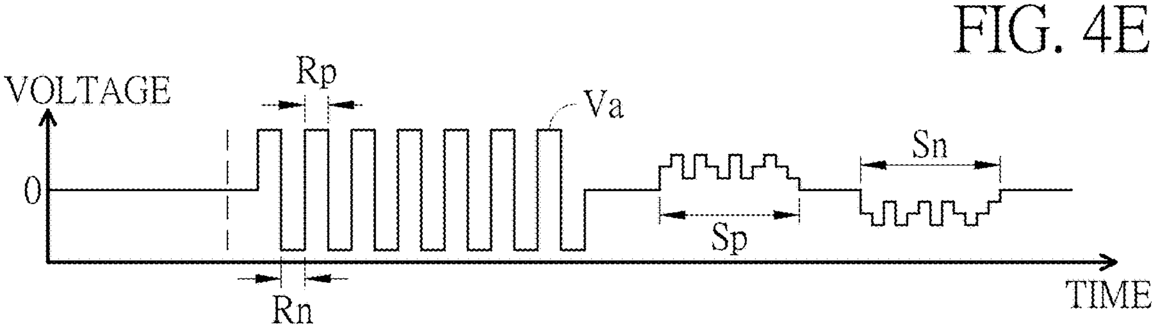
FIG. 4F is another waveform perspective view of the voltage difference across one of the display units of the driver system of the present invention.

With references to FIGS. 4A to 4F, a vertical axis of each of FIGS. 4A to 4F represents voltage in units of volt (V), and a horizontal axis of each of FIGS. 4A to 4F represents time in units of millisecond (ms). FIGS. 4D to 4F respectively correspond to the data driver voltages (Vd), the common electrode voltage (Vcom), and the voltage differences (Va) received by one of the display units 111, wherein the voltage differences (Va) are created by the data driver voltages (Vd) and the common electrode voltage (Vcom). The static image display command C1 is included in the image control signal C, and once the static image display command C1 is triggered, the timing controller 10 controls the AM ChLCD 100 to execute the set of image reset sequences and the set of static image display sequences.

With references to FIGS. 4A to 4F, a time duration of the set of image reset sequences in this embodiment is twice longer than time duration of the set of image reset sequences in the embodiment shown for FIGS. 3A to 3F. However, regardless of any time durations for the set of image reset sequences, the at least one positive polarity reset period (Rp) and the at least one negative polarity reset period (Rn) within the set of image reset sequences have same total durations, same averaged voltage magnitudes, and opposite but symmetric voltage polarities. Moreover, the at least one positive polarity display period (Sp) and the at least one negative polarity display period (Sn) within the set of static image display sequences have same total durations, same averaged voltage magnitudes, and opposite but symmetric voltage polarities. As a result, regardless of the driver system of the present invention executing the set of image reset sequences or the set of static image display sequences have same total durations, the driver system of the present invention is driving the AM ChLCD 100 with voltages of same voltage magnitudes but opposite voltage polarities, thus preventing the AM ChLCD 100 from being permanently polarized by being driven with voltages of a same polarity for an extended period of time. By preventing the cholesteric liquid crystals within the AM ChLCD 100 from being permanently polarized, the cholesteric liquid crystals do not create a voltage bias within the cholesteric liquid crystal layer, and thus the AM ChLCD 100 is prevented from developing displaying abnormalities such as image sticking and uneven brightness due to being permanently polarized.

In another embodiment, the set of static image display sequences includes a plurality of the positive polarity display periods (Sp) and a plurality of the negative polarity display periods (Sn). Furthermore, a number of the positive polarity display periods (Sp) and a number of the negative polarity display periods (Sn) are equal. A total duration of the positive polarity display periods (Sp) and a total duration of the negative polarity display periods (Sn) are equal. An averaged voltage magnitude of the plurality of data driver voltages (Vd) within the positive polarity display periods (Sp) and an averaged voltage magnitude of the plurality of data driver voltages (Vd) within the negative polarity display periods (Sn) are equal. Within the set of static image display sequences, a total voltage average of adding the data driver voltages (Vd) with positive polarity and the data driver voltages (Vd) with negative polarity equals zero. More particularly, an averaged voltage magnitude of the plurality of data driver voltages (Vd) within each of the positive polarity display periods (Sp) and an averaged voltage magnitude of the plurality of data driver voltages (Vd) within each of the negative polarity display periods (Sn) are equal. Within one of the positive polarity display periods (Sp) and one of the negative polarity display periods (Sn), a total voltage average of adding the data driver voltages (Vd) with positive polarity and the data driver voltages (Vd) with negative polarity also equals zero.

Within the set of static image display sequences, the positive polarity display periods (Sp) and the negative polarity display periods (Sn) are sequentially arranged in an alternating order. This means that one of the positive polarity display periods (Sp) is sequentially arranged to be between two of the negative polarity display periods (Sn), and that one of the negative polarity display periods (Sn) is sequentially arranged to be between two of the positive polarity display periods (Sp). Please note that, as the total voltage average of adding the data driver voltages (Vd) with positive polarity for each of the positive polarity display periods (Sp) plus the data driver voltages (Vd) with negative polarity for each of the negative polarity display periods (Sn) equals zero volt within the set of static image display sequences, the positive polarity display periods (Sp) and the negative polarity display periods (Sn) within the set of static image display sequences may be sequentially arranged in any arbitrary order elsewise than the present embodiment.

With reference to FIG. 1, in an embodiment, the driver system 1 of the AM ChLCD 100 includes a temperature detection module 30. The temperature detection module 30 includes a temperature signal output port 31, and the timing controller 10 includes a temperature communication port 14. The temperature signal output port 31 of the temperature detection module 30 is connected to the temperature communication port 14 of the timing controller 10. The temperature detection module 30 is either placed inside of the AM ChLCD 100 or on the AM ChLCD 100. For example, in an embodiment, the temperature detection module 30 is mounted on a circuit board within the AM ChLCD 100. In another embodiment, the temperature detection module 30 is mounted on an exterior surface of the AM ChLCD 100. The temperature detection module 30 detects a device temperature of the AM ChLCD 100 and generates a temperature signal T according to the device temperature. The temperature detection module 30 outputs the temperature signal T through the temperature signal output port 31 to the temperature communication port 14 of the timing controller 10. In an embodiment, the temperature signal output port 31 of the temperature detection module 30 communicates with the temperature communication port 14 of the timing controller 10 through an inter-integrated circuit ($I^2C$).

A viscosity and an attraction force between the cholesteric liquid crystals are dependent on the device temperature of the AM ChLCD 100, and moreover, the viscosity and the attraction force between the cholesteric liquid crystals also affect an amount of voltage needed to drive the cholesteric liquid crystals. Namely, the higher the viscosity and the higher the attraction force between the cholesteric liquid crystals are, a greater amount of voltage is needed to drive the cholesteric liquid crystals of the AM ChLCD 100; and the lower the viscosity and the lower the attraction force between the cholesteric liquid crystals are, a less amount of voltage is needed to drive the cholesteric liquid crystals of the AM ChLCD 100. By having the timing controller 10 storing a temperature-to-voltage table, a relationship between the device temperature of the AM ChLCD 100 and the amount of voltage needed to drive the AM ChLCD 100 is defaulted. In an embodiment, the temperature-to-voltage table records a plurality of possible device temperatures of the AM ChLCD 100 in various situations, and for each of the possible device temperatures of the AM ChLCD 100, the temperature-to-voltage table records various voltage values needed to drive the AM ChLCD 100 for displaying or resetting the current display.

When the timing controller 10 receives the temperature signal T, the timing controller 10 adjusts the voltage control command (Iv) according to the temperature signal T, and the timing controller 10 outputs the voltage control command (Iv) to the power supply module 20. Through adjusting the voltage control command (Iv), the timing controller 10 is able to configure voltage values of the gate driver voltage (Vg), the plurality of data driver voltages (Vd), and the common electrode voltage (Vcom) that are outputted by the power supply module 20. As such, the timing controller 10 is able to adjust various voltages outputted from the power supply module 20 to the AM ChLCD 100 according to the device temperature of the AM ChLCD 100.

For example, when the device temperature of the AM ChLCD 100 rises, the timing controller 10 determines how much the various voltages that are driving the AM ChLCD 100 should be decreased according to the temperature signal T and the temperature-to-voltage table. Once determined, the timing controller 10 then adjusts the voltage control command (Iv) and outputs the voltage control command (Iv) to the power supply module 20 for decreasing the voltage values of the gate driver voltage (Vg), the plurality of data driver voltages (Vd), and the common electrode voltage (Vcom). Vice versa, when the device temperature of the AM ChLCD 100 lowers, the timing controller 10 determines how much the various voltages that are driving the AM ChLCD 100 should be increased according to the temperature signal T and the temperature-to-voltage table. Once determined, the timing controller 10 then adjusts the voltage control command (Iv) and outputs the voltage control command (Iv) to the power supply module 20 for increasing the voltage values of the gate driver voltage (Vg), the plurality of data driver voltages (Vd), and the common electrode voltage (Vcom).

By taking the device temperature into account, the timing controller 10 is able to even better regulate the voltages needed to drive the AM ChLCD 100, ensuring that no more than necessary amount of electric power is wasted, ensuring high energy efficiency for driving the AM ChLCD 100, and ensuring the AM ChLCD 100 is able to display the current display with adequate brightness and colorization under various temperature conditions.

Figure 5:
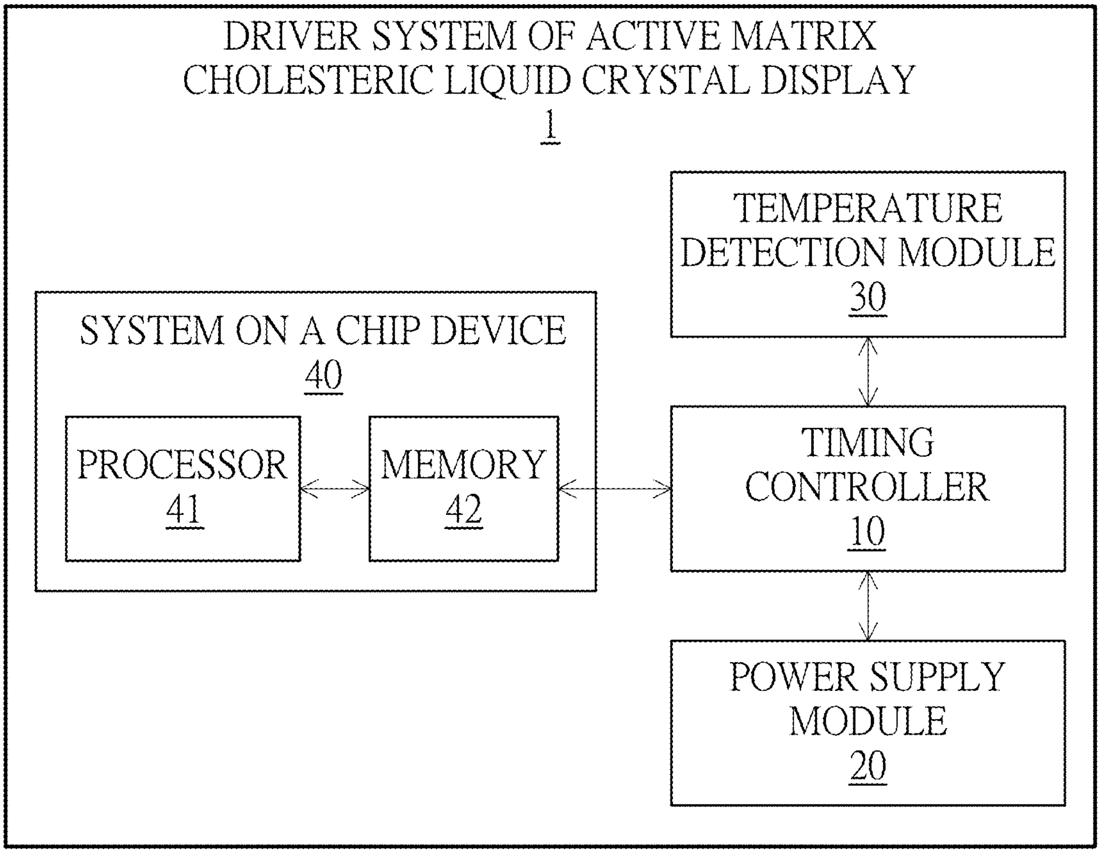
FIG. 5 is another block diagram of the driver system of the present invention.
Figure 6:
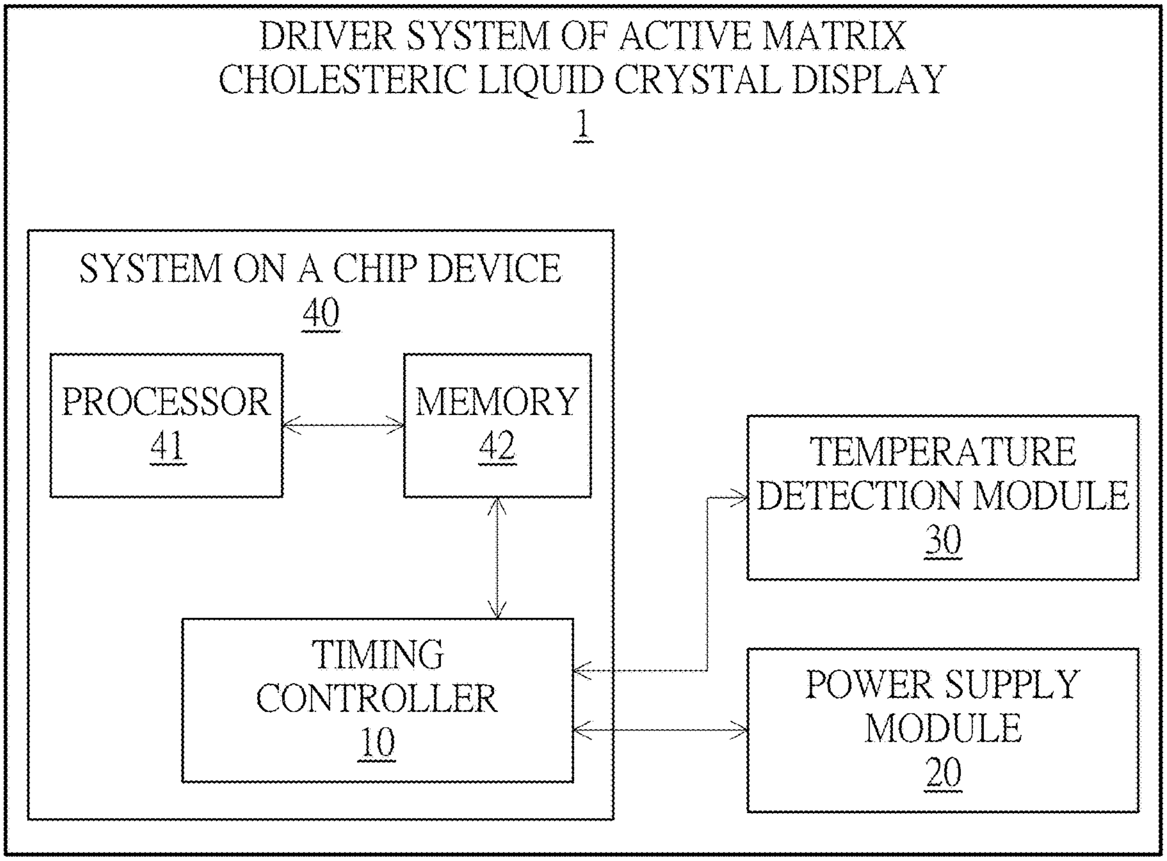
FIG. 6 is another block diagram of the driver system of the present invention.

With references to FIG. 5 and FIG. 6, the driver system 1 of the AM ChLCD 100 is utilized as a system on a chip (SoC). For example, the SoC includes a system on a chip (SoC) device 40, the SoC device 40 includes a processor 41 and a memory 42, and the processor 41 is electrically connected to the memory 42. The processor 41 processes a static image data, and thus the processor 41 generates the static image parameter data according to a voltage parameter of each of the pixels that are included in the static image data. The processor 41 generates the vertical synchronization signal (Vsync) and the data enable signal (DE) that corresponds to the static image parameter data, and the processor 41 stores the static image parameter data, the vertical synchronization signal (Vsync), and the data enable signal (DE) in the memory 42. The memory 42 is connected to the timing controller 10, and the timing controller 10 receives the static image parameter data, the vertical synchronization signal (Vsync), and the data enable signal (DE) from the memory 42. In an embodiment, the processor 41 configures a time duration of the set of image reset sequences and/or a time duration of the set of static image display sequences according to chronological sequences of the static image parameter data, of the vertical synchronization signal (Vsync), and of the data enable signal (DE).

With reference to FIG. 5, in an embodiment, the timing controller 10 is a piece of hardware that is mounted outside of the SoC device 40 and connected to the SoC device 40 for receiving the static image parameter data, the vertical synchronization signal (Vsync), and the data enable signal (DE) from the SoC device 40. Moreover, in an embodiment, the SoC device 40 communicates to the timing controller 10 for transporting the static image parameter data, the vertical synchronization signal (Vsync), and the data enable signal (DE) through serial peripheral interface bus (SPI) with low-voltage differential signaling (LVDS). In another embodiment, the SoC device 40 communicates to the timing controller for transporting the static image parameter data, the vertical synchronization signal (Vsync), and the data enable signal (DE) through mobile industry processor interface (MIPI).

With reference to FIG. 6, in an embodiment, the timing controller 10 is a timing controlling software that is installed in the SoC device 40 and connected to the memory 42 for receiving the static image parameter data, the vertical synchronization signal (Vsync), and the data enable signal (DE) from the SoC device 40.

In an embodiment, the memory 42 stores a device characteristic information, the device characteristic information includes a relationship data that characterizes a driving time required for using various voltages to drive different materials of the cholesteric liquid crystals in the AM ChLCD 100. The different materials of the cholesteric liquid crystals in the AM ChLCD 100 characteristically entail different viscosities, different fluidities, different molecular distances, and different molecular arrangements of the cholesteric liquid crystals. For example, under same driving voltage conditions, the higher the viscosity of the cholesteric liquid crystals in the AM ChLCD 100, the longer time duration the AM ChLCD 100 needs to drive the cholesteric liquid crystals, so as to adequately twist and adjust the cholesteric liquid crystals into a certain arrangement.

As the processor 41 adjusts the static image parameter data, the vertical synchronization signal (Vsync), and the data enable signal (DE) according to the device characteristic information, the processor 41 configures the time duration of the set of image reset sequences and/or the time duration of the set of static image display sequences according to the chronological sequences of the static image parameter data, of the vertical synchronization signal (Vsync), and of the data enable signal (DE). For example, the processor 41 is able to configure a number of frames included in the set of image reset sequences and/or in the time duration of the set of static image display sequences.

For example, according to a characterization of a material of the cholesteric liquid crystals in the AM ChLCD 100, and according to the corresponding voltage required to drive the said material as detailed in the device characteristic information, when the AM ChLCD 100 is required to drive the cholesteric liquid crystals with a longer driving time, the processor 41 then accordingly increases the time duration of the set of image reset sequences and/or the time duration of the set of static image display sequences. Vice versa, when the AM ChLCD 100 is required to drive the cholesteric liquid crystals with a shorter driving time, the processor 41 then accordingly decreases the time duration of the set of image reset sequences and/or the time duration of the set of static image display sequences.

In another embodiment, the memory 42 stores a device characteristic information, the device characteristic information includes a relationship data that characterizes a driving voltage required for driving different materials of the cholesteric liquid crystals in the AM ChLCD 100 with various driving times. The different materials of the cholesteric liquid crystals in the AM ChLCD 100 characteristically entail different viscosities, different fluidities, different molecular distances, and different molecular arrangements of the cholesteric liquid crystals. For example, under same driving times, the higher the viscosity of the cholesteric liquid crystals in the AM ChLCD 100, the greater driving voltages the AM ChLCD 100 needs to drive the cholesteric liquid crystals, so as to adequately twist and adjust the cholesteric liquid crystals into a certain arrangement.

As the processor 41 configures the time duration of the set of image reset sequences and/or the time duration of the set of static image display sequences according to the chronological sequences of the static image parameter data, the vertical synchronization signal (Vsync), and the data enable signal (DE), the processor 41 configures the voltage parameters of the set of image reset sequences and/or the voltage parameters of the set of static image display sequences. As such, as the static image parameter data is adjusted, the timing controller 10 is able to generate and output the voltage control command (Iv) and the image display command (Id) according to the vertical synchronization signal (Vsync), the data enable signal (DE), and the static image parameter data. The power supply module 20 generates adequate driving voltages for the AM ChLCD 100 according to the voltage control command (Iv), and the timing controller 10 supplies the said adequate driving voltages into each of the display units 111 through controlling the data driver component 130.

For example, according to the characterization of the material of the cholesteric liquid crystals in the AM ChLCD 100, and according to the set of image reset sequences and/or the set of static image display sequences that is being executed, when the AM ChLCD 100 is required to drive the cholesteric liquid crystals with greater voltages, the processor 41 then accordingly increases the voltage values of the driving voltages outputted by the power supply 20 through adjusting the static image parameter data according to the device characteristic information. Vice versa, when the AM ChLCD 100 is required to drive the cholesteric liquid crystals with less voltages, the processor 41 then accordingly decreases the voltage values of the driving voltages outputted by the power supply 20 through adjusting the static image parameter data according to the device characteristic information.

By taking the device characteristic information of the AM ChLCD 100 into account, the driver system 1 of the present invention is able to adequately adjust how the AM ChLCD 100 is being driven, thus ensuring more precise control over the AM ChLCD 100, ensuring that no more than necessary amount of electric power is wasted, and ensuring various needs for driving the AM ChLCD 100 are satisfied.

Figure 7:
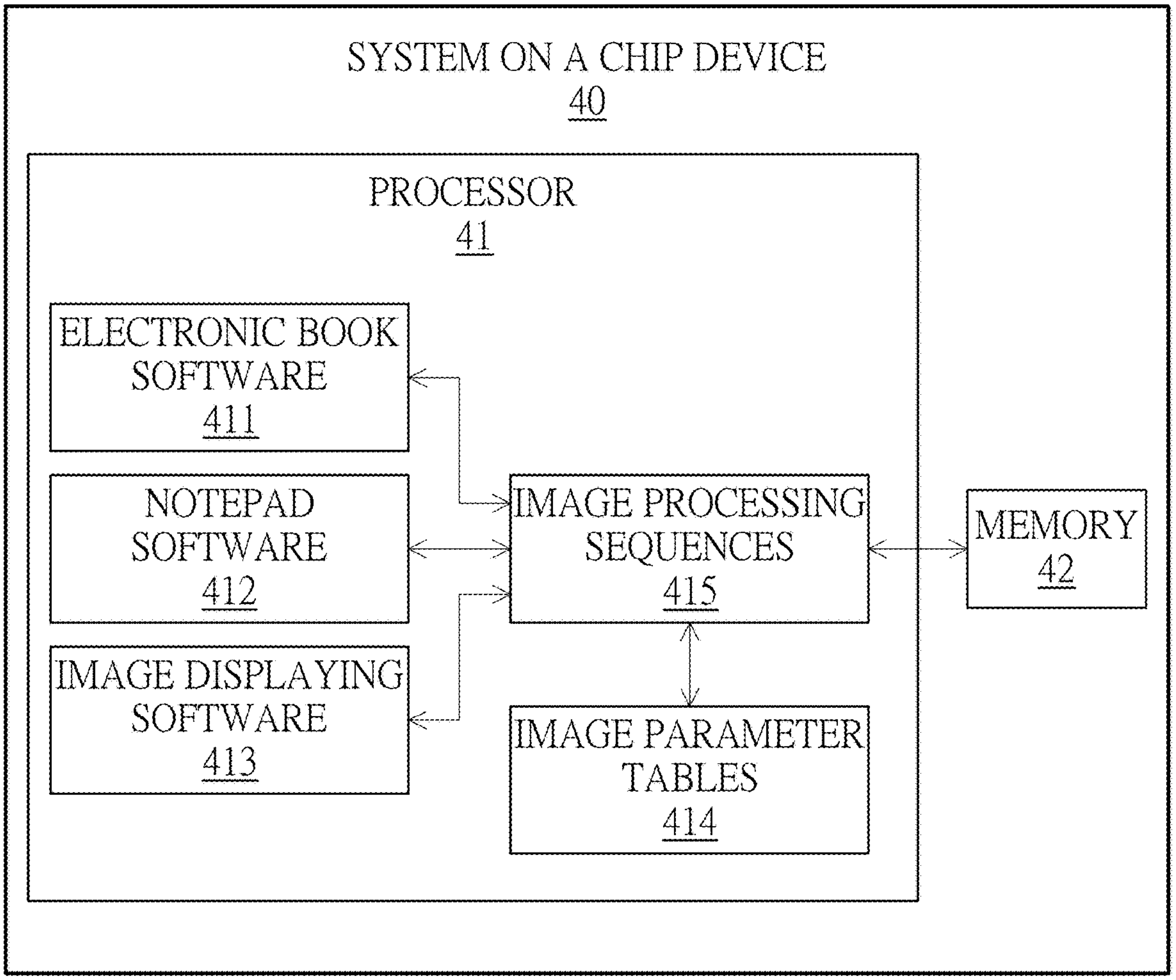
FIG. 7 is another block diagram of the driver system of the present invention.

With reference to FIG. 7, in an embodiment, the processor 41 includes an electronic book software 411, a notepad software 412, an image displaying software 413, a plurality of image parameter tables 414, and a set of image processing sequences 415. The processor 41 is able to receive the static image data of an electronic book from the electronic book software 411, the static image data of a note from the notepad software 412, or the static image data of a file from the image displaying software 413. Each of the image parameter tables 414 corresponds to a different image or video file type, and each of the image parameter tables 414 includes voltage parameters for displaying an image under different brightness and colorization conditions corresponding to the different image or video file types. The set of image processing sequences 415 is connected to the electronic book software 411, the notepad software 412, and the image displaying software 413, thus the set of image processing sequences 415 is able to receive the static image data from the electronic book software 411, the notepad software 412, and/or the image displaying software 413. According to the image or video file type corresponding to the static image data, the processor 41 image processes the static image data with the set of image processing sequences 415 according to one of the image parameter tables 414, and thus the processor 41 generates the static image parameter data corresponding to the static image data. In an embodiment, the processor 41 operates with a Linux operating system and/or an Android operating system.

In an embodiment, the electronic book software 411, the notepad software 412, and the image displaying software 413 are able to receive an image control signal C, wherein the image control signal C is generated according to how a user of the present invention uses the AM ChLCD 100. For example, when the user wishes to read the electronic book stored in the electronic book software 411, the user uses the AM ChLCD 100, causing the AM ChLCD 100 to generate the image control signal C. The AM ChLCD 100 then outputs the static image data corresponding to the electronic book specified by the image control signal C and subsequently displays an image of the electronic book.

In an embodiment, the processor 41 is able to receive a user configuration data through executing the electronic book software 411, the notepad software 412, and/or the image displaying software 413. The user configuration data is inputted by the user into the AM ChLCD 100. The user configuration data includes a displaying contrast parameter, a displaying enhancement parameter, a displaying brightness parameter, and displaying colorization parameter for the current display that is being displayed by the AM ChLCD 100 through the electronic book software 411, the notepad software 412, and/or the image displaying software 413. The memory 42 may also store a display characteristic information. The display characteristic information characterizes a relationship between various displaying parameters, various driving voltages, the time duration of the set of image reset sequences, and/or the time duration of the set of static image display sequences. The display characteristic information thus includes a relationship data that characterizes a driving voltage required for driving the AM ChLCD 100 under the various displaying parameters with various driving times.

On one hand, the processor 41 is able to adjust the chronological sequences of the static image parameter data, the vertical synchronization signal (Vsync), and the data enable signal (DE) according to the user configuration data and the display characteristic information, thus further adjusting the time duration of the set of image reset sequences, and/or the time duration of the set of static image display sequences, such as adjusting the number of frames included in the set of image reset sequences and/or in the time duration of the set of static image display sequences, for satisfying a display condition set forth by the user upon the current display of the AM ChLCD 100. For example, when the displaying contrast parameter is increased according to the user configuration data, under the same driving voltage, a longer driving time is required to satisfy the displaying contrast parameter as according to the display characteristic information. Therefore, the processor 41 would increase the time duration of the set of image reset sequences, and/or the time duration of the set of static image display sequences. Vice versa, when the displaying contrast parameter is decreased according to the user configuration data, less driving time and less driving voltage are required to satisfy the displaying contrast parameter as according to the display characteristic information. Therefore, the processor 41 would decrease the time duration of the set of image reset sequences, and/or the time duration of the set of static image display sequences.

On the other hand, the processor 41 is also able to adjust the voltage parameter of each of the pixels in the static image parameter data according to the user configuration data and the display characteristic information for the chronological sequences of the static image parameter data, the vertical synchronization signal (Vsync), and the data enable signal (DE) under the set of image reset sequences, and/or the time duration of the set of static image display sequences. This allows the timing controller 10 to output the voltage control command (Iv) and the image display command (Id) according to the vertical synchronization signal (Vsync), the data enable signal (DE), and the static image parameter data, thus allowing the power supply module 20 to generate adequate driving voltages for the AM ChLCD 100 according to the voltage control command (Iv), and allowing the timing controller 10 to supply the said adequate driving voltages into each of the display units 111 through controlling the data driver component 130. For example, when the displaying contrast parameter is increased according to the user configuration data, under the set of image reset sequences, and/or the time duration of the set of static image display sequences, greater voltage values are required for driving the AM ChLCD 100 in order to satisfy the displaying contrast parameter as according to the display characteristic information. Therefore, the processor 41 would increase the driving voltages outputted by the power supply module 20 according to the display characteristic information. Vice versa, when the displaying contrast parameter is decreased according to the user configuration data, under the set of image reset sequences, and/or the time duration of the set of static image display sequences, less voltage values are required for driving the AM ChLCD 100 in order to satisfy the displaying contrast parameter as according to the display characteristic information. Therefore, the processor 41 would decrease the driving voltages outputted by the power supply module 20 according to the display characteristic information.

Figure 8:
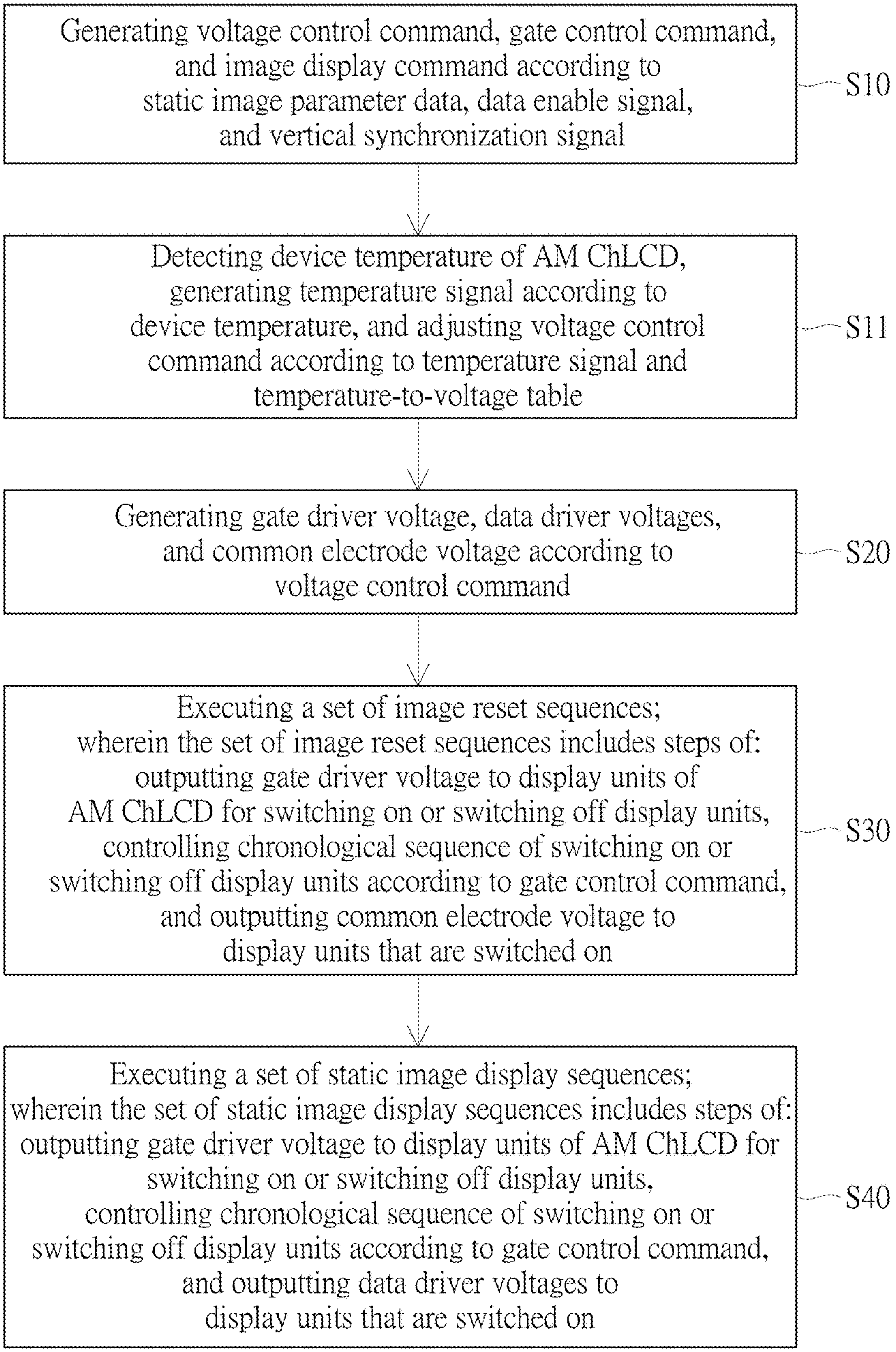
FIG. 8 is a flow chart of a static image displaying method of the AM ChLCD of the present invention.

With reference to FIG. 8, a static image displaying method of an AM ChLCD of the present invention is utilized for controlling the AM ChLCD 100, and the static image displaying method of the present invention is executed by the driver system 1 of the AM ChLCD 100. The static image displaying method of the present invention includes the following steps:

step S10: generating a voltage control command (Iv), a gate control command (Ig), and an image display command (Id) according to a static image parameter data, a data enable signal (DE), and a vertical synchronization signal (Vsync);

step S20: generating a gate driver voltage (Vg), a plurality of data driver voltages (Vd), and a common electrode voltage (Vcom) according to the voltage control command (Iv);

step S30: executing a set of image reset sequences; wherein the set of image reset sequences includes steps of: outputting the gate driver voltage (Vg) to the plurality of display units 111 of the AM ChLCD 100 for switching on or switching off the plurality of display units 111, controlling a chronological sequence of switching on or switching off the plurality of display units 111 according to the gate control command (Ig), and outputting the common electrode voltage (Vcom) to the plurality of display units 111 that are switched on for resetting the plurality of display units 111 that are switched on; and step S40: executing a set of static image display sequences; wherein the set of static image display sequences includes steps of: outputting the gate driver voltage (Vg) to the plurality of display units 111 of the AM ChLCD 100 for switching on or switching off the plurality of display units 111, controlling the chronological sequence of switching on or switching off the plurality of display units 111 according to the gate control command (Ig), and outputting the plurality of data driver voltages (Vd) to the plurality of display units 111 that are switched on for displaying a static image on the plurality of display units 111 that are switched on.

In step S30, the set of image reset sequences includes at least one positive polarity reset period (Rp) and at least one negative polarity reset period (Rn). Within the at least one positive polarity reset period (Rp), the common electrode voltage (Vcom) with negative polarity is outputted to the plurality of display units 111 that are switched on. Within the at least one negative polarity reset period (Rn), the common electrode voltage (Vcom) with positive polarity is outputted to the plurality of display units 111 that are switched on. A voltage magnitude of the common electrode voltage (Vcom) with negative polarity equals a voltage magnitude of the common electrode voltage (Vcom) with positive polarity. A total duration of the at least one positive polarity reset period (Rp) equals a total duration of the at least one negative polarity reset period (Rn). In the set of image reset sequences, a total voltage average of adding the common electrode voltage (Vcom) with negative polarity and the common electrode voltage (Vcom) equals zero.

In step S40, the set of static image display sequences includes at least one positive polarity display period (Sp) and at least one negative polarity display period (Sn). Within the at least one positive polarity display period (Sp), the plurality of data driver voltages (Vd) with positive polarity are outputted to the plurality of display units 111. Within the at least one negative polarity display period (Sn), the plurality of data driver voltages (Vd) with negative polarity are outputted to the plurality of display units 111. An averaged voltage magnitude of the plurality of data driver voltages (Vd) within each positive polarity display period (Sp) equals an averaged voltage magnitude of the plurality of data driver voltages (Vd) within each negative polarity display period (Sn). A total duration of each positive polarity display period (Sp) equals a total duration of each negative polarity display period (Sn). Within one of the positive polarity display periods (Sp) and one of the negative polarity display periods (Sn), a total voltage average of adding the data driver voltages (Vd) with positive polarity and the data driver voltages (Vd) with negative polarity also equals zero.

Furthermore, in an embodiment, step S10 further includes the following step:

step S11: detecting a device temperature of the AM ChLCD 100, generating a temperature signal T according to the device temperature, and adjusting the voltage control command (Iv) according to the temperature signal T and a temperature-to-voltage table.

In an embodiment, step S10 further includes steps of:

adjusting chronological sequences of the static image parameter data, the vertical synchronization signal (Vsync), and the data enable signal (DE) according to a device characteristic information; and configuring the time duration of the set of image reset sequences and/or the time duration of the set of static image display sequences according to the chronological sequences of the static image parameter data, of the vertical synchronization signal (Vsync), and of the data enable signal (DE).

In an embodiment, step S10 further includes a step of: adjusting a voltage parameter of each pixel in the static image parameter data according to the device characteristic information. Step S20 further includes a step of: generating the voltage control command (Iv) and an image display command (Id) according to the vertical synchronization signal (Vsync), the data enable signal (DE), and the static image parameter data. Step S30 further includes a step of: generating the gate driver voltage (Vg), the plurality of data driver voltages (Vd), and the common electrode voltage (Vcom) according to the voltage control command (Iv) for satisfying the displaying characteristics of the AM ChLCD 100.

In an embodiment, step S10 includes steps of:

receiving a user configuration data inputted by the user;

adjusting the chronological sequences of the static image parameter data, of the vertical synchronization signal (Vsync), and of the data enable signal (DE) according to a display characteristic information of the AM ChLCD 100 and the user configuration data; and configuring the time duration of the set of image reset sequences and/or the time duration of the set of static image display sequences according to the chronological sequences of the static image parameter data, of the vertical synchronization signal (Vsync), and of the data enable signal (DE).

In an embodiment, step S10 includes steps of: receiving a user configuration data inputted by the user; and adjusting a voltage parameter of each pixel in the static image parameter data according to a display characteristic information of the AM ChLCD 100 and the user configuration data. Step S20 further includes a step of: generating the voltage control command (Iv) and an image display command (Id) according to the vertical synchronization signal (Vsync), the data enable signal (DE), and the static image parameter data. Step S30 further includes a step of: generating the gate driver voltage (Vg), the plurality of data driver voltages (Vd), and the common electrode voltage (Vcom) according to the voltage control command (Iv).

Overall, the driver system 1 of the AM ChLCD 100 and the static image displaying method thereof, utilize the voltage control command (Iv) outputted by the timing controller 10 to control the power supply module 20 to supply the gate driver voltage (Vg), the plurality of data driver voltages (Vd), and the common electrode voltage (Vcom) to the AM ChLCD 100, and also utilize the gate control command (Ig) and the image display command (Id) outputted by the timing controller 10 to control the AM ChLCD 100 for displaying a static image.

As the processor 41 before the timing controller 10 already image processes the static image data with the set of image processing sequences, the timing controller 10 of the present invention does not need to image process the static image data. Instead of requiring a large memory to store the static image data for a conventional driver of a conventional passive matrix cholesteric liquid crystal display (PM ChLCD) to image process, the timing controller 10 of the present invention only needs to generate corresponding commands according to the static image parameter data that is outputted by the processor 41, and thus the timing controller 10 of the present invention requires significantly less memory. As a result, by requiring much less memory, the present invention is able to free up more physical space required for implementing memory, decrease cost for implementing memory, and allowing the driver system 1 of the AM ChLCD 100 to be more miniaturized overall.

Furthermore, since the AM ChLCD 100 utilizes active electronic components instead of passive ones, unlike the conventional PM ChLCD, less time is required for the AM ChLCD 100 to update each frame. Under a same driving voltage, the AM ChLCD 100 is able to display with higher contrast than the conventional PM ChLCD does. Moreover, the timing controller 10 of the present invention does not need to iteratively drive the AM ChLCD 100 with the same data driver voltage (Vd) for raising the contrast in a current display. This allows the AM ChLCD 100 to update the current display with less amount of time, and allows the AM ChLCD 100 to have a higher frame rate for displaying and updating the static image, thus allowing the user to view and read the static image with a better experience.

Furthermore, within the set of image reset sequences, the present invention utilizes voltages of same voltage magnitude but opposite polarities, or more specifically, the common electrode voltage (Vcom) with positive polarity and the common electrode voltage (Vcom) with negative polarity to drive the AM ChLCD 100. Similarly, within the set of static image display sequences, the present invention also utilizes voltages of same voltage magnitude but opposite polarities, or more specifically, the plurality of data driver voltages (Vd) with positive polarity and the plurality of data driver voltages (Vd) with negative polarity to drive the AM ChLCD 100. As a result, the present invention is able to prevent the cholesteric liquid crystals of the AM ChLCD 100 from being permanently polarized, and thus preventing image sticking and uneven brightness in the current display, and increasing a life expectancy of the AM ChLCD 100.

The present invention adjusts the time duration of the set of image reset sequences and/or the time duration of the set of static image display sequences according to the device characteristic information of the AM ChLCD 100 or the user configuration data. The present invention also accordingly adjusts the gate driver voltage (Vg), the plurality of data driver voltages (Vd), and the common electrode voltage (Vcom) outputted to the AM ChLCD 100 for satisfying a device characteristic of the AM ChLCD 100, or for satisfying a certain display characteristic specified by the user. As a result, the present invention is able to more precisely drive the AM ChLCD 100 to better display the static image.

What is claimed is:

1. A driver system of an active matrix cholesteric liquid crystal display (AM ChLCD), utilized for controlling the AM ChLCD, wherein the AM ChLCD comprises a gate driver component, a data driver component, and a plurality of display units; wherein the plurality of display units are electrically connected to the gate driver component and the data driver component; wherein the driver system of the AM ChLCD comprises:

a timing controller, connected to the AM ChLCD; wherein according to a static image parameter data, a data enable signal, and a vertical synchronization signal, the timing controller generates a voltage control command, a gate control command, and an image display command, outputs the gate control command to the gate driver component, outputs the image display command to the data driver component, and controls the AM ChLCD to execute a set of static image display sequences;

a power supply module, connected to the timing controller and the AM ChLCD; wherein according to the voltage control command, the power supply module generates a gate driver voltage and a plurality of data driver voltages, outputs the gate driver voltage to the gate driver component, and outputs the plurality of data driver voltages to the data driver component;

wherein in the set of static image display sequences: the timing controller controls a chronological sequence of commanding the gate driver component to switch on or switch off the plurality of display units according to the gate control command; the gate driver component controls the plurality of display units to switch on or switch off according to the gate driver voltage; according to the image display command, the timing controller controls the data driver component to output the plurality of data driver voltages to the plurality of display units that are switched on;

wherein the set of static image display sequences comprises at least one positive polarity display period and at least one negative polarity display period; within the at least one positive polarity display period, the data driver component outputs the plurality of data driver voltages with positive polarity, and within the at least one negative polarity display period, the data driver component outputs the plurality of data driver voltages with negative polarity;

wherein a total duration of each of the at least one positive polarity display period equals a total duration of each of at least one the negative polarity display period;

wherein an averaged voltage magnitude of the plurality of data driver voltages within each of the at least one positive polarity display period equals an averaged voltage magnitude of the plurality of data driver voltages within each of the at least one negative polarity display period.

2. The driver system as claimed in claim 1, wherein the at least one positive polarity display period and the at least one negative polarity display period within the set of static image display sequences are sequentially arranged in any arbitrary order.

3. The driver system as claimed in claim 1, further comprising:

a temperature detection module, connected to the timing controller, mounted on the AM ChLCD for detecting a device temperature of the AM ChLCD, and generating a temperature signal according to the device temperature;

wherein the timing controller adjusts the voltage control command according to the temperature signal and a temperature-to-voltage table.

4. The driver system as claimed in claim 1, wherein the timing controller controls the AM ChLCD to execute a set of image reset sequences, and the power supply module generates a common electrode voltage according to the voltage control command;

wherein in the set of image reset sequences: the timing controller controls a chronological sequence of commanding the gate driver component to switch on or switch off the plurality of display units according to the gate control command; the gate driver component controls the plurality of display units to switch on or switch off according to the gate driver voltage; the timing controller controls the data driver component to output the common electrode voltage to the plurality of display units that are switched on;

wherein the set of image reset sequences comprises at least one positive polarity reset period and at least one negative polarity reset period; within the at least one positive polarity reset period, the plurality of display units that are switched on respectively receive the common electrode voltage with negative polarity, and within the at least one negative polarity reset period, the plurality of display units that are switched on respectively receive the common electrode voltage with positive polarity;

wherein a total duration of the at least one positive polarity reset period equals a total duration of the at least one negative polarity reset period;

wherein a voltage magnitude of the common electrode voltage with negative polarity in the at least one positive polarity reset period equals a voltage magnitude of the common electrode voltage with positive polarity in the at least one negative polarity reset period.

5. The driver system as claimed in claim 4, further comprising:

a system on a chip (SoC), connected to the AM ChLCD, and comprising:

a processor, image processing a static image data, and generating the static image parameter data, the vertical synchronization signal, and the data enable signal according to a voltage parameter of each pixel in the static image parameter data;

a memory, connected to the processor, storing the static image parameter data, the vertical synchronization signal, and the data enable signal.

6. The driver system as claimed in claim 5, wherein the processor adjusts chronological sequences of the static image parameter data, the vertical synchronization signal, and the data enable signal according to a device characteristic information, and the processor configures a time duration of the set of image reset sequences or a time duration of the set of static image display sequences according to the chronological sequences of the static image parameter data, the vertical synchronization signal, and the data enable signal; or the processor adjusts the voltage parameter of each pixel in the static image parameter data according to the device characteristic information;

wherein the device characteristic information comprises a relationship data that characterizes a driving voltage required for driving different materials of cholesteric liquid crystals in the AM ChLCD with various driving times.

7. The driver system as claimed in claim 5, wherein the processor comprises a plurality of image parameter tables and a set of image processing sequences, and each of the image parameter tables corresponds to a different image or video file type;

wherein the processor image processes the static image data with the set of image processing sequences according to one of the image parameter tables, and thus the processor generates the static image parameter data corresponding to the static image data.

8. The driver system as claimed in claim 5, wherein the processor adjusts chronological sequences of the static image parameter data, the vertical synchronization signal, and the data enable signal according to a display characteristic information and a user configuration data, and the processor configures a time duration of the set of image reset sequences or a time duration of the set of static image display sequences according to the chronological sequences of the static image parameter data, the vertical synchronization signal, and the data enable signal; or the processor adjusts the voltage parameter of each pixel in the static image parameter data according to the display characteristic information and the user configuration data;

wherein the user configuration data comprises various displaying parameters for the AM ChLCD, and the display characteristic information comprises a relationship data that characterizes a driving voltage required for driving the AM ChLCD under the various displaying parameters with various driving times.

9. A static image displaying method of an active matrix cholesteric liquid crystal display (AM ChLCD), executed by a driver system for controlling the AM ChLCD, comprising steps as follows:

generating a voltage control command, a gate control command, and an image display command according to a static image parameter data, a data enable signal, and a vertical synchronization signal;

generating a gate driver voltage and a plurality of data driver voltages according to the voltage control command;

executing a set of static image display sequences; wherein the set of static image display sequences comprises steps of: outputting the gate driver voltage for switching on or switching off a plurality of display units of the AM ChLCD, controlling a chronological sequence of switching on or switching off the plurality of display units according to the gate control command, and outputting the plurality of data driver voltages to the plurality of display units that are switched on;

wherein the set of static image display sequences comprises at least one positive polarity display period and at least one negative polarity display period; within the at least one positive polarity display period, the plurality of data driver voltages with positive polarity are outputted to the plurality of display units, and within the at least one negative polarity display period, the plurality of data driver voltages with negative polarity are outputted to the plurality of display units;

wherein a total duration of each of the at least one positive polarity display period equals a total duration of each of the at least one negative polarity display period;

wherein an averaged voltage magnitude of the plurality of data driver voltages within each of the at least one positive polarity display period equals an averaged voltage magnitude of the plurality of data driver voltages within each of the at least one negative polarity display period.

10. The static image displaying method as claimed in claim 9, wherein the at least one positive polarity display period and the at least one negative polarity display period within the set of static image display sequences are sequentially arranged in any arbitrary order.

11. The static image displaying method as claimed in claim 9, wherein after the voltage control command is generated, further comprising the following steps:

detecting a device temperature of the AM ChLCD, generating a temperature signal according to the device temperature, and adjusting the voltage control command according to the temperature signal and a temperature-to-voltage table.

12. The static image displaying method as claimed in claim 9, further comprising steps as follows:

generating a common electrode voltage according to the voltage control command;

executing a set of image reset sequences; wherein the set of image reset sequences comprises steps of: outputting the gate driver voltage to the plurality of display units for switching on or switching off the plurality of display units, controlling a chronological sequence of switching on or switching off the plurality of display units according to the gate control command, and outputting the common electrode voltage to the plurality of display units that are switched on;

wherein the set of image reset sequences comprises at least one positive polarity reset period and at least one negative polarity reset period; within the at least one positive polarity reset period, the plurality of display units that are switched on respectively receive the common electrode voltage with negative polarity, and within the at least one negative polarity reset period, the plurality of display units that are switched on respectively receive the common electrode voltage with positive polarity;

wherein a total duration of the at least one positive polarity reset period equals a total duration of the at least one negative polarity reset period;

wherein a voltage magnitude of the common electrode voltage with negative polarity in the at least one positive polarity reset period equals a voltage magnitude of the common electrode voltage with positive polarity in the at least one negative polarity reset period.

13. The static image displaying method as claimed in claim 12, further comprising:

adjusting chronological sequences of the static image parameter data, the vertical synchronization signal, and the data enable signal; and configuring a time duration of the set of image reset sequences or a time duration of the set of static image display sequences according to the chronological sequences of the static image parameter data, the vertical synchronization signal, and the data enable signal; or adjusting the voltage parameter of each pixel in the static image parameter data according to the device characteristic information;

wherein the device characteristic information comprises a relationship data that characterizes a driving voltage required for driving different materials of cholesteric liquid crystals in the AM ChLCD with various driving times.

14. The static image displaying method as claimed in claim 12, further comprising:

adjusting chronological sequences of the static image parameter data, the vertical synchronization signal, and the data enable signal according to a display characteristic information and a user configuration data; and configuring a time duration of the set of image reset sequences or a time duration of the set of static image display sequences according to the chronological sequences of the static image parameter data, the vertical synchronization signal, and the data enable signal; or adjusting the voltage parameter of each pixel in the static image parameter data according to the display characteristic information and the user configuration data;

wherein the user configuration data comprises various displaying parameters for the AM ChLCD, and the display characteristic information comprises a relationship data that characterizes a driving voltage required for driving the AM ChLCD under the various displaying parameters with various driving times.

* * * * *